United States Patent
Lin

(10) Patent No.: US 8,311,757 B2
(45) Date of Patent: *Nov. 13, 2012

(54) MINIATURIZED SMART SELF-CALIBRATION ELECTRONIC POINTING METHOD AND SYSTEM

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 741 days.

This patent is subject to a terminal disclaimer.

(21) Appl. No.: 12/228,766

(22) Filed: Aug. 14, 2008

(65) Prior Publication Data

US 2009/0070058 A1 Mar. 12, 2009

Related U.S. Application Data

(60) Provisional application No. 60/964,899, filed on Aug. 14, 2007.

(51) Int. Cl.
*G01C 25/00* (2006.01)
*G01C 19/00* (2006.01)

(52) U.S. Cl. ............ 702/92; 702/93; 702/141; 73/503.3; 73/504.02; 73/504.03; 73/504.08; 73/504.18

(58) Field of Classification Search .................... 702/92, 702/93, 141; 73/503.3, 504.02, 504.03, 504.08, 73/504.18; 701/216
See application file for complete search history.

(56) References Cited

OTHER PUBLICATIONS

Inertial Science Inc. "Digital Miniature Attitude Reference System DMRAS-i," 1999.*

* cited by examiner

*Primary Examiner* — Sujoy Kundu
(74) *Attorney, Agent, or Firm* — Raymond Y. Chan; David and Raymond Patent Firm

(57) ABSTRACT

An innovative configuration of Miniaturized Smart Self-calibration EPD for mortar applications, as the azimuth/heading and elevation measurement device. This innovative EPD configuration uses only two FOGs or DTG and accelerometers and it is self-contained. This leads to a new EPD implementation that produces a small and light device with lower cost and adequate accuracy for the small dismounted mortar applications.

9 Claims, 38 Drawing Sheets

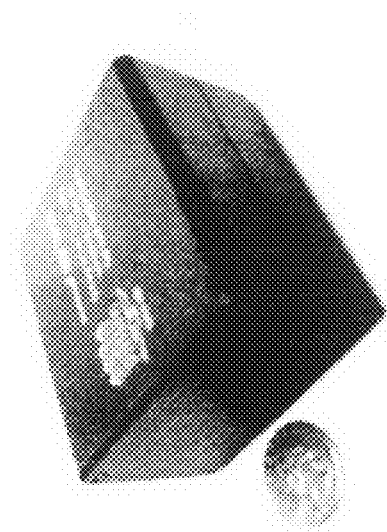
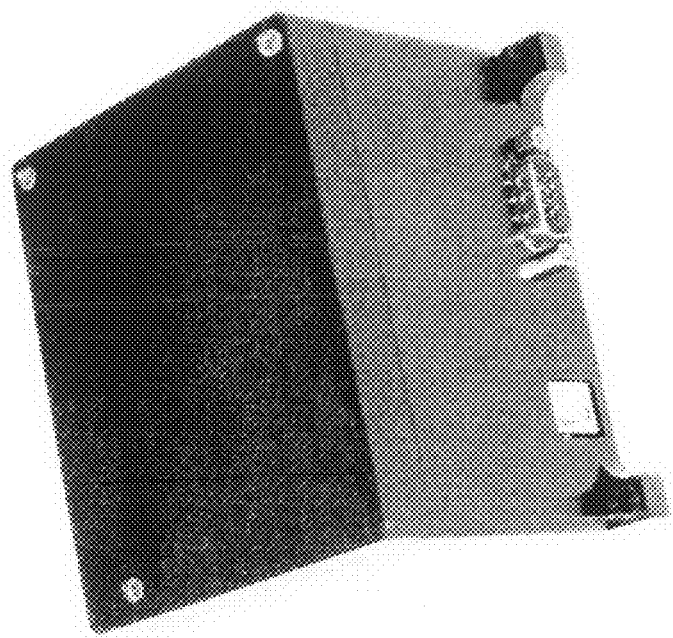
FIG. 2

MINIATURIZED SMART SELF-CALIBRATION ELECTRONIC POINTING METHOD AND SYSTEM

CROSS REFERENCE OF RELATED APPLICATION

This is a regular application of a provisional application having an application No. 60/964,899 and a filing date of Aug. 14, 2007.

GOVERNMENT INTERESTS

This invention was made with Government support under contracts W15QKN-06-C-0043 and W15QKN-06-C-0225 awarded by ARMY. The Government has certain rights in the invention.

BACKGROUND OF THE PRESENT INVENTION

1. Field of Invention

The present invention relates to a pointing device, and more particularly to a self-contained miniaturized smart self-calibration Electronic Pointing Device (EPD) for dismounted/mounted mortar weapons.

2. Description of Related Arts

The mortar's barrel pointing is a process of elevation and azimuth determination followed by pointing correction. The attitude determination and mortar pointing correction could be either separated in time sub-procedures or be a simultaneous process. The primary factors for the elevation and azimuth assignment are the coordinates of the mortar and the target on the map where the distance between the two points and the North direction is well defined. The mortar elevation is defined as an angle between its longitudinal axis and the earth's local horizontal plane. The mortar azimuth/heading is defined as an angle between the true North direction and the longitudinal axis counted from the North line in the horizontal plane (so that it complies with the map reading).

By definition, the azimuth is the bearing angle between the North direction (established by the line from the mortar base to the North) and the longitudinal axis of the mortar barrel (in a horizontal plane). The North direction is established on the map and/or physically by the two points S and N, as depicted in FIG. 3.

The mortar heading relates to its bearing angles with a simple formula:

$$\sin(\text{Azimuth} - B_N) = \frac{L_{SM}}{L_{SN}} \sin(B_N - B_S).$$

With a certain correction on the elevation this relation allows considering the use of the mortar sight device for accurate pointing when the South-North baseline is physically established by GPS stands or natural markers designated on the local map.

The mortar's elevation is easy to determine using the local gravity vector's projection on the mortar barrel axes. Similarly the Earth rate projections give the heading of the mortar. Two physical vectors (gravity and Earth rate) are widely used in a heading elevation determination for stationary objects and this process is known as gyrocompassing.

Special attention is needed in considering the attitude determination and alignment with respect to the local vertical and north directions for moving objects. Changing a mortar base position with the carrier's movement (mounted mortar) alters the measurements. In general, we can not distinguish whether the attitude determination error/initial misalignment or the real movement causes the measurements changes. External information about the mortar's moves with respect to the earth (in addition to the inertial measurements) is needed. This information can be derived from the GPS aided INS and DGPS attitude determination system.

Significant improvements can be made by taking into account the different behaviours of the mortar movement with respect to the earth and unknown initial misalignment i.e. initial heading and elevation (these are unknown constants). In other words, the different spectra of the desired quantity (initial attitude) and of the mortar movements at low frequency allow estimating eventually the current attitude. In some cases when the motions are well modeled (with a restricted bandwidth in the frequency domain) we can perform the attitude determination in parallel with inertial sensor calibration owing to the mortar's movements.

Returning to the dismounted mortar we shall concentrate on the sensors calibration and error compensation. Since the mortar barrel movements are essential for the calibration process we introduce the indexing device (see chapter 2.6) for this purpose.

SUMMARY OF THE PRESENT INVENTION

The main object of this invention is to implement, test, evaluate, and demonstrate a self-contained Miniaturized Smart Self-calibration Electronic Pointing Device (EPD) for dismounted/mounted mortar weapons. The EPD is based on small, lightweight, and relatively inexpensive inertial sensors, with an indexing device and an AGNC's Coremicro® Palm Navigator (CPN) for calibration and test aiding. The EPD features small size, light weight, portability, and low cost, with satisfactory performance for small mortar weapons and other fire control applications.

The invention's challenges and innovations include:
1. Attempt to achieve a very difficult technical objective, in a tactical device, to an extent never before achieved in such devices:
   Use only two axes tactical grade gyros instead of three-axis navigation grade IMU (Inertial Measurement Unit) for the dismounted mortar attitude determination;
   Use an embedded turntable indexing device to assist calculation of attitude and elevation.
2. User-friendly and lightweight pointing device.
3. For dismounted mortars as well as mounted mortar systems.
4. Small and light device with lower cost and adequate accuracy.
5. AGNC's Coremicro® Palm Navigator as processing, testing and evaluation platform as well as for display and networking.

The major challenge of the invention is to realize a small size, lightweight, and rugged Electronic Pointing Device for small dismounted mortar applications, with comparable accuracy and performance as to current mortar weapon pointing devices, such as the Honeywell Talin II-3000.

American GNC (AGNC) has investigated and proved the feasibility of an innovative configuration of Miniaturized Smart Self-calibration EPD for mortar applications, as the azimuth/heading and elevation measurement device. This innovative EPD configuration uses only two FOGs or DTG and accelerometers and it is self-contained. This leads to a new EPD implementation that produces a small and light device with lower cost and adequate accuracy for the small dismounted mortar applications. We have built a prototype of the innovative EPD and test it in a laboratory testbed. The EPD system utilizes the AGNC IMU and Coremicro® Palm Navigator incorporated in the indexing device. The system is used as the mortars azimuth/heading and elevation measurement device. The system has a reduced number of gyroscopes, from three to two. The indexing of the sensors orientation in the EPD (to perform the system self-calibration) relaxes the requirements for the sensors (from the inertial to the tactical grade). Thus, the targeted gyro and accelerometer performance can be expressed as an in-run stability of ~0.005 (deg/hr)/min and ~0.2 mg/min, respectively. The system uses the processor system of AGNC's existing Coremicro® Palm Navigator as a computation platform for the EPD and a PDA is used as the user interface device for display and network communication.

We have successfully developed practical commercial integrated systems of the azimuth/heading and elevation determination, which could find wide applications in both the government and commercial sectors. The EPD system has been modeled and verified with a detailed simulation in different battlefield environments. The requirements for the inertial sensors performance, self-calibration procedure, attitude determination algorithm and the communication interface IMU-Coremicro® Palm Navigator-mortar squad leader-Mortar Platoon Center have been analyzed and evaluated.

Currently, azimuth and elevation determination of the mobile mortar/howitzer is normally accomplished by using high precision inertial navigation systems with or without GPS aid [MILNAV® Kearfott, Talin II-3000 Honeywell]. However, the weight is large, the power consumption is large and the cost is high.

An indexing device allows performing in-field automatic self calibration removing measurement biases and relaxing requirements to the gyro and accelerometer performance. This approach in turn yields a cost efficient solution along with precision attitude determination using tactical grade sensors with good short term stability.

FIG. 1 shows the systems architecture.

In order to refine our system implementation approach for this invention we performed a great deal of research and analysis on survey of current systems and sensors, the available state of the art technologies and techniques, and comparison of the different system implementation approaches. According to our research, we analyzed the following possible/available system approaches for the mortar Electronic Pointing Device implementations:

1. Use of a high accuracy (navigation grade) inertial navigation system (INS) as a mortar Electronic Pointing Device. This is a self-contained system based on gyrocompass initialization and dead-reckoning computation. Navigation grade gyros are the key sensors for the INS system. The realized systems vary in size, weight and cost with different types of gyros:
   INS with ring laser gyros (RLGs);
   INS with fiber optic gyros (FOGs);
   INS with dynamically tuned gyros (DTGs), etc.
   This INS based system implementation approach can achieve very high accuracy but with big size over the Honeywell Talin II-3000, at present, with current technologies.
2. Use of a tactical grade INS, but with a GPS receiver, combined with some GPS/INS integration technologies. This type of system can be small, by using small gyros, such as, small FOGs, quartz gyros, even MEMS gyros. But, this system can only obtain high accuracy heading during a maneuvering motion or a short time after the maneuvering motion, because the system needs GPS data and acceleration for heading calibration. This kind of system may not be suitable for a dismounted mortar if it does not move a lot in operation.
3. Use of a small and low cost inertial navigation system (INS) with GPS attitude determination as a mortar Electronic Pointing Device. This type of system combines the advantages of the high dynamics of an INS and high accuracy of GPS attitude determination. Two or more GPS antennas are used. This can only be accomplished with the improvement of a GPS receiver's accuracy and robustness and more advanced signal processing technologies.
4. Use of an optical sight device with DGPS baseline. This system performs a triangulation on the baseline (created by two-GPS stands) measuring distance and bearing angles to both baseline ends. Baseline data and measurements processed with AGNC's Coremicro® Palm Navigator result in the azimuth and elevation angles of the mortar tube being determined. The complexity of the system (due to the need to physically establish the baseline with the direct visibility) and cost inefficiency of the optical sight are disadvantages of this approach.
5. Use of AGNC's IMU in an indexing device as a self calibrated EPD. This approach uses a tactical grade IMU sensor (on a bias level), but with a gimbal for the self-calibration (dismounted mortar-stationary position). This type of system can be small, by using small gyros, such as small FOGs, quartz gyros, even MEMS gyros. An example of this type of system is the AGNC coremicro AHRS/INS/GPS Integration Unit. This kind of system may be suitable for a dismounted mortar if it does not move a lot in operation.

We have demonstrated the feasibility of the technical approach 5 presented above as the EPD for the dismounted mortar. Details of the analysis based on the technical approach 5 are present as follows:

An indexing device allows performing in field automatic self calibration removing measurement biases and relaxing requirements to the gyro and accelerometer performance. This approach in turn gives a cost efficient solution along with precision attitude determination using tactical grade sensors with good short term stability.

This invention has laid a solid foundation to successfully develop and deliver practical commercial integrated systems of the azimuth/heading and elevation determination, which could find wide applications in both the government and commercial sectors. The EPD system has been modeled and verified with a detailed simulation in different battlefield environments. The requirements for the inertial sensors performance, self-calibration procedure, attitude determination algorithm and communication interface IMU-Palm Navigator-mortar squad leader-Mortar Platoon Center have been analyzed and evaluated.

We have concluded that an innovative configuration of the Miniaturized Smart Self-calibration EPD for mortar applications, as the azimuth/heading and elevation measurement device using only two FOGs or DTG and accelerometers is feasible. This leads to a new EPD implementation that produces a small and light device with lower cost and adequate accuracy for the small dismounted mortar applications. AGNC's 21 years of experience in inertial navigation systems, our matured navigation products and testing facilities are exploited in this invention. This invention leads us to choose the most cost efficient yet size and weight winning system configuration for the dismounted mortar EPD.

BRIEF DESCRIPTION OF THE DRAWINGS

FIG. 2 is a perspective view of AGNC coremicro Palm Navigator (CPN)—Basis for the EPD.

DETAILED DESCRIPTION OF THE PREFERRED EMBODIMENT

1. Introduction

Figure 1:
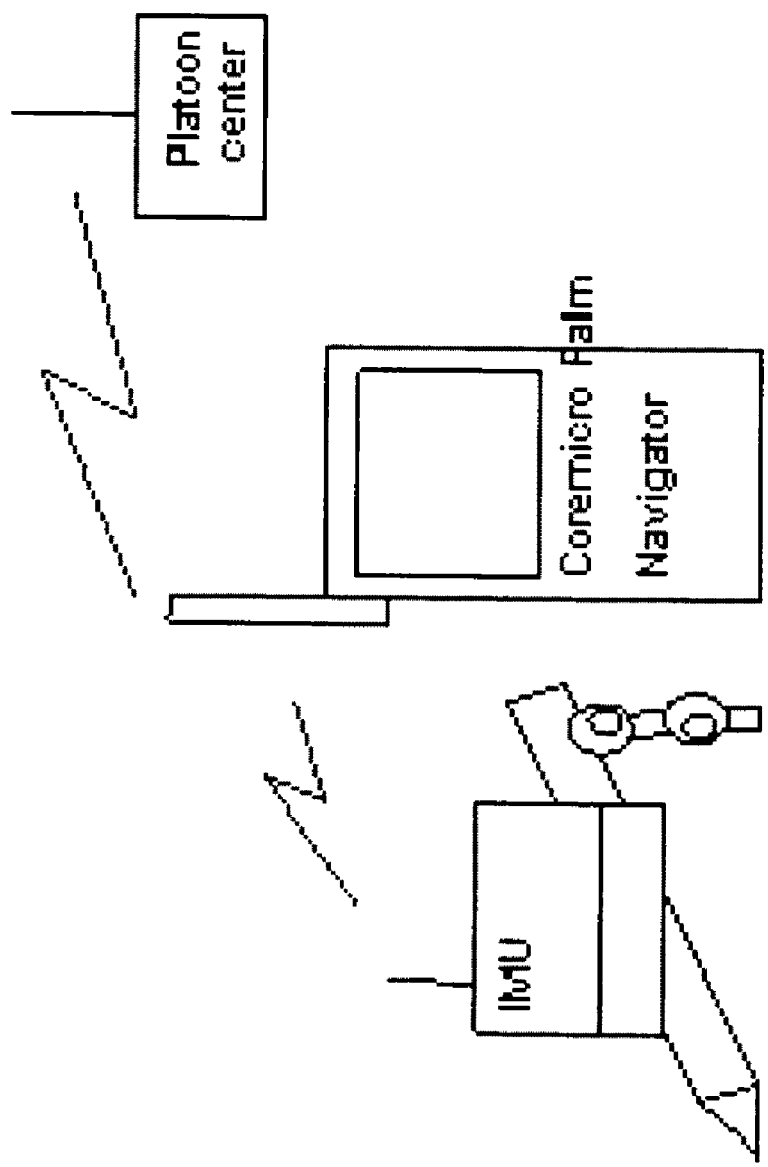
FIG. 1 illustrates the EPD system architecture.

The objective of this invention is to analyze, evaluate, and demonstrate the feasibility of an innovative Miniaturized Smart Self-calibration Electronic Pointing Device (EPD) for dismounted/mounted mortar weapons based on the AGNC coremicro Palm Navigator, as shown in FIG. 2. The miniaturized and lightweight system provides complete and very accurate mortars motion measurements including: azimuth/heading and elevation angles, plus mortar (or vehicle) position, velocity, linear acceleration, and angular velocity. AGNC is an acronym of American GNC Corporation. "Coremicro" is a registered trademark of American GNC Corporation.

According to the invention's requirements, the major challenge of the invention is to realize a small size, lightweight, and rugged EPD for small dismounted mortar applications, with comparable accuracy and performance as to current mortar weapon pointing devices, such as the Honeywell Talin II-3000.

In order to refine our system implementation approach for this invention we performed a great deal of research and analysis on survey of current systems and sensors, the available state of the art technologies and techniques, and comparison of the different system implementation approaches. According to our research and analysis, and our past experience in this field for more than 20 years, we analyzed the following possible/available system approaches for the mortar Electronic Pointing Device implementations:

1. Use of a high accuracy (navigation grade) inertial navigation system (INS) as a mortar EPD. This is a self-contained system based on gyrocompass initialization and dead-reckoning computation. Navigation grade gyros are the key sensors for the INS system. The realized systems vary in size, weight and cost with different types of gyros:
   INS with ring laser gyros (RLGs);
   INS with fiber optic gyros (FOGs);
   INS with dynamically tuned gyros (DTGs), etc.

This INS based system implementation approach can achieve very high accuracy but with big size over the Honeywell Talin II-3000, at present, with current technologies.

2. Use of a tactical grade INS, but with a GPS receiver, combined with some GPS/INS integration technologies. This type of system can be small, by using small gyros, such as, small FOGs, quartz gyros, even MEMS gyros. But, this system can only obtain high accuracy heading during a maneuvering motion or a short time after the maneuvering motion, because the system needs GPS data and acceleration for heading calibration. This kind of system may not be suitable for a dismounted mortar if it does not move a lot in operation.

3. Use of a small and low cost inertial navigation system (INS) with GPS attitude determination as a mortar Electronic Pointing Device. This type of system combines the advantages of the high dynamics of an INS and high accuracy of GPS attitude determination. Two or more GPS antennas are used. This can only be accomplished with the improvement of a GPS receiver's accuracy and robustness and more advanced signal processing technologies.

4. Use of an optical sight device with DGPS baseline. This system performs a triangulation on the baseline (created by two-GPS stands) measuring distance and bearing angles to both baseline ends. Baseline data and measurements processed with AGNC's Coremicro® Palm Navigator result in the azimuth and elevation angles of the mortar tube being determined. The complexity of the system (due to the need to physically establish the baseline with the direct visibility) and cost inefficiency of the optical sight are disadvantages of this approach.

5. Use of AGNC's IMU in an indexing device as a self calibrated EPD. This approach uses a tactical grade IMU sensor (on a bias level), but with a gimbal for the self-calibration (dismounted mortar-stationary position). This type of system can be small, by using small gyros, such as small FOGs, quartz gyros, even MEMS gyros. An example of this type of system is the AGNC coremicro AHRS/INS/GPS Integrate Unit. This kind of system may be suitable for a dismounted mortar if it does not move a lot in operation.

This invention has demonstrated the feasibility of the technical approach 5 presented above as a concept of the EPD for the dismounted mortar. Details of the analysis based on the technical approach 5 are present as follows:

An indexing device 12 allows performing in field automatic self calibration removing measurement biases and relaxing requirements to the gyro and accelerometer performance. This approach in turn gives a cost efficient solution along with precision attitude determination using tactical grade sensors with good short term stability.

This invention has successfully developed practical commercial integrated systems of the azimuth/heading and elevation determination, which could find wide applications in both the government and commercial sectors. The EPD system has been modeled and verified with a detailed simulation in different battlefield environments. The requirements for the inertial sensors performance, self-calibration procedure, attitude determination algorithm and communication interface IMU-Palm Navigator-mortar squad leader-Mortar Platoon Center have been analyzed and evaluated.

We have concluded that an innovative configuration of the Miniaturized Smart Self-calibration EPD for mortar applications, as the azimuth/heading and elevation measurement device using only two FOGs or DTG and accelerometers is feasible. This leads to a new EPD implementation that produces a small and light device with lower cost and adequate accuracy for the small dismounted mortar applications. AGNC's 21 years of experience in inertial navigation systems, our matured navigation products and testing facilities are exploited in this invention. This invention produces a most cost efficient yet size and weight winning system configuration for the dismounted mortar EPD.

2. System Approach 2.1. Concept Overview

The mortar's barrel pointing is a process of elevation and azimuth determination followed by pointing correction. The attitude determination and mortar pointing correction could be either separated in time sub-procedures or be a simultaneous process. The primary factors for the elevation and azimuth assignment are the coordinates of the mortar and the target on the map where the distance between the two points and the North direction is well defined. The mortar elevation is defined as an angle between its longitudinal axis and the earth's local horizontal plane. The mortar azimuth/heading is defined as an angle between the true North direction and the longitudinal axis counted from the North line in the horizontal plane (so that it complies with the map reading).

Figure 3:
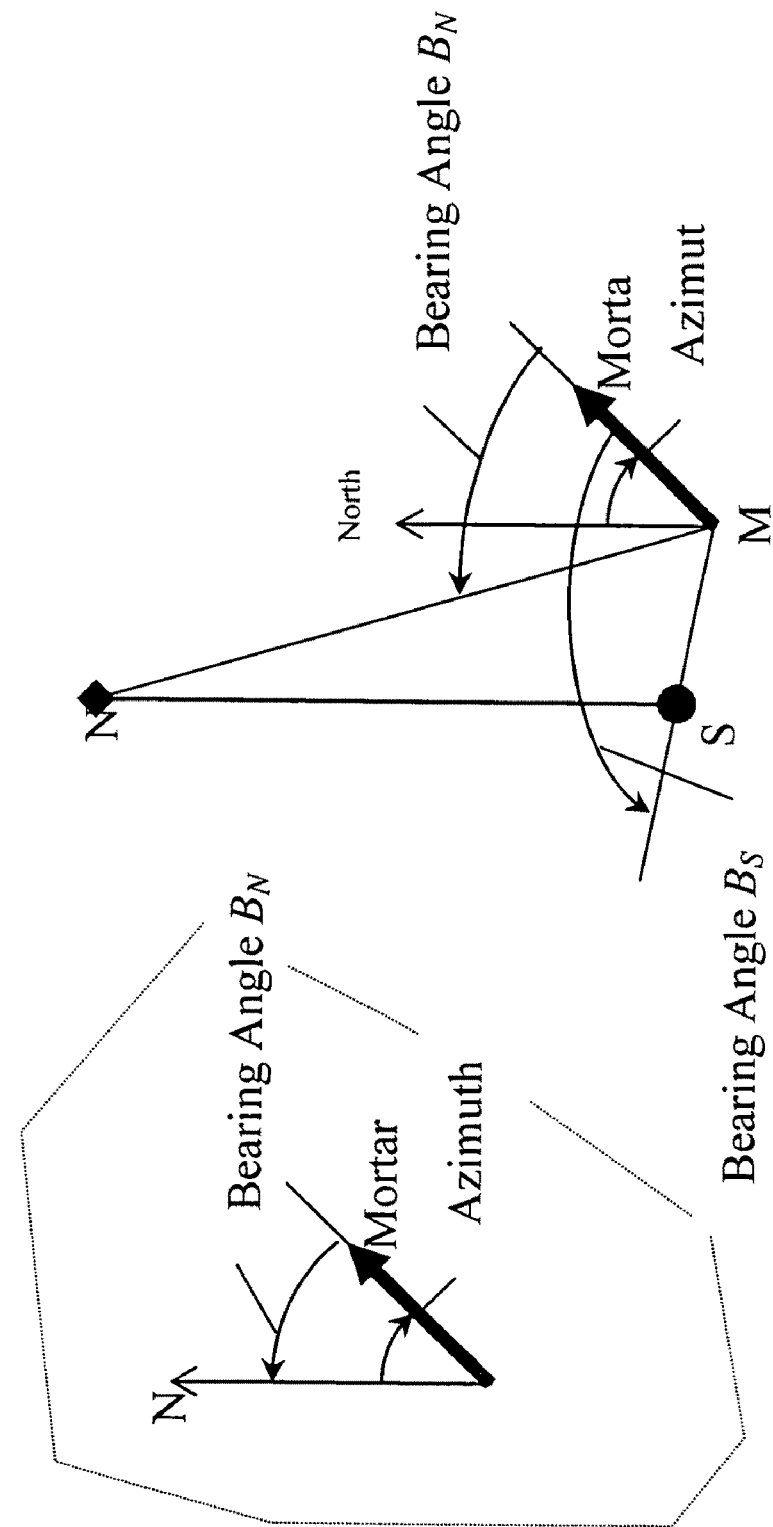
FIG. 3 illustrates the mortar heading definition.

By definition, the azimuth is the bearing angle between the North direction (established by the line from the mortar base to the North) and the longitudinal axis of the mortar barrel (in a horizontal plane). The North direction is established on the map and/or physically by the two points S and N, as depicted in FIG. 3.

The mortar heading relates to its bearing angles with a simple formula:

$$\sin(\text{Azimuth} - B_N) = \frac{L_{SM}}{L_{SN}} \sin(B_N - B_S).$$

With a certain correction on the elevation this relation allows considering the use of the mortar sight device for accurate pointing when the South-North baseline is physically established by GPS stands or natural markers designated on the local map.

The mortar's elevation is easy to determine using the local gravity vector's projection on the mortar barrel axes. Similarly the Earth rate projections give the heading of the mortar. Two physical vectors (gravity and Earth rate) are widely used in a heading elevation determination for stationary objects and this process is known as gyrocompassing.

Special attention is needed in considering the attitude determination and alignment with respect to the local vertical and north directions for moving objects. Changing a mortar base position with the carrier's movement (mounted mortar) alters the measurements. In general, we can not distinguish whether the attitude determination error/initial misalignment or the real movement causes the measurements changes. External information about the mortar's moves with respect to the earth (in addition to the inertial measurements) is needed. This information can be derived from the GPS aided INS and DGPS attitude determination system.

Significant improvements can be made by taking into account the different behaviours of the mortar movement with respect to the earth and unknown initial misalignment i.e. initial heading and elevation (these are unknown constants). In other words, the different spectra of the desired quantity (initial attitude) and of the mortar movements at low frequency allow estimating eventually the current attitude. In some cases when the motions are well modeled (with a restricted bandwidth in the frequency domain) we can perform the attitude determination in parallel with inertial sensor calibration owing to the mortar's movements.

Returning to the dismounted mortar we shall concentrate on the sensors calibration and error compensation. Since the mortar barrel movements are essential for the calibration process we introduce the indexing device 12 (see chapter 2.6) for this purpose.

2.2. INS

This approach uses a high accuracy (navigation grade) inertial navigation system (INS) as a mortar Electronic Pointing Device. This is a self-contained system based on gyrocompass initialization and dead-reckoning computation.

Navigation grade gyros are the key sensors for the INS system. The realized systems vary in size, weight and cost with different types of gyros:

INS with ring laser gyros (RLGs);
  INS with fiber optic gyros (FOGs);
  INS with dynamically tuned gyros (DTGs), etc.

In Table 2-1, the Honeywell Talin II-3000 and the Northrop FOG IMU Grumman LN-270 belong to this type, though they can also operate in the GPS/INS integration mode. In all FOG type IMUs only the Northrop Grumman FOG IMU LN-270 meets the same type of accuracy as the Honeywell Talin II-3000.

During initial alignment, the INS based EPD obtains the true north and level reference autonomously through a so-called gyrocompassing process. At the end of gyrocompassing, it gets highly accurate initial heading/azimuth and elevation (attitude) and starts the navigation mode.

In the navigation mode, the INS based EPD tracks the true heading/azimuth and elevation of the mortar tube in real-time even under motion, shock or other conditions. The tracking process does not need any external aiding devices—that is why it is called "self-contained", compared to other technologies such as DGPS or an optical method.

Current mortar weapons "Pointing Devices" are too big, heavy and expensive. For example, the Honeywell Talin II-3000 and the Northrop Grumman FOG IMU LN-270 require a big battery due to their high power consumption. They also need a heavy shock bracket to protect the RLG (ring laser gyro). The whole system is too heavy, especially for dismounted mortar weapons. This INS based system implementation approach can achieve very high accuracy but with big size, at present, with current technologies.

2.3. Ins Aided by GPS

This approach uses a tactical grade INS, but with a GPS receiver, combined with some GPS/INS integration technologies. This type of system can be small, by using small gyros, such as small FOGs, quartz gyros, even MEMS gyros. An example of this type of system is AGNC's coremicro AHRS/INS/GPS Integration Unit.

This system can only obtain high accuracy heading during a maneuvering motion or a short time after the maneuvering motion, because the system needs GPS data and acceleration for heading calibration. This kind of system may not be suitable for a dismounted mortar if it does not move a lot in operation.

2.4. Ins with DGPS Attitude Determination

This approach uses a small and low cost inertial navigation system (INS) with GPS attitude determination as a mortar Electronic Pointing Device. This type of system combines the advantages of the high dynamics of an INS and the high accuracy of GPS attitude determination. Two or more GPS antennas are used.

AGNC has rich experience in integration of inertial navigation systems (INS) with GPS attitude determination. Our previously implemented "Integrated GPS/INS Mortar Pointing System" solution has the advantages of low cost, small, and light weight. Its capability is limited by the magnitude of the tube's elevation angle.

It uses low cost MEMS gyros and low cost single frequency GPS in the AGNC Palm Navigator based EPD (about $1K~$2K cost for the whole system). It has the advantages of low cost, and of being small, lightweight and rugged. Disadvantages: it needs to be assisted with highly accurate and more expensive dual-frequency GPS systems to meet the mortar pointing accuracy requirements.

The previous Integrated GPS/INS Mortar Pointing System design is driven by low cost and small size concerns. It is capable of measuring the heading when the mortar elevation angle is small. It has difficulty to measure the heading when the mortar elevation angle is large. Almost half of the GPS satellites signals are blocked by the tube. If high performance dual frequency GPS receivers are used, the heading can be measured when the mortar elevation angle is large, because the wide lane wave length of dual frequency is 86 cm instead of 19 cm for the single frequency.

2.5. GPS Baseline and Optical Sight

Unlike gyrocompassing this approach is based on a navigation field created by GPS rather then on earth rate measurements and translates GPS determined baseline azimuth to the mortar heading by measuring bearing angles on the GPS antennas.

Figure 4:
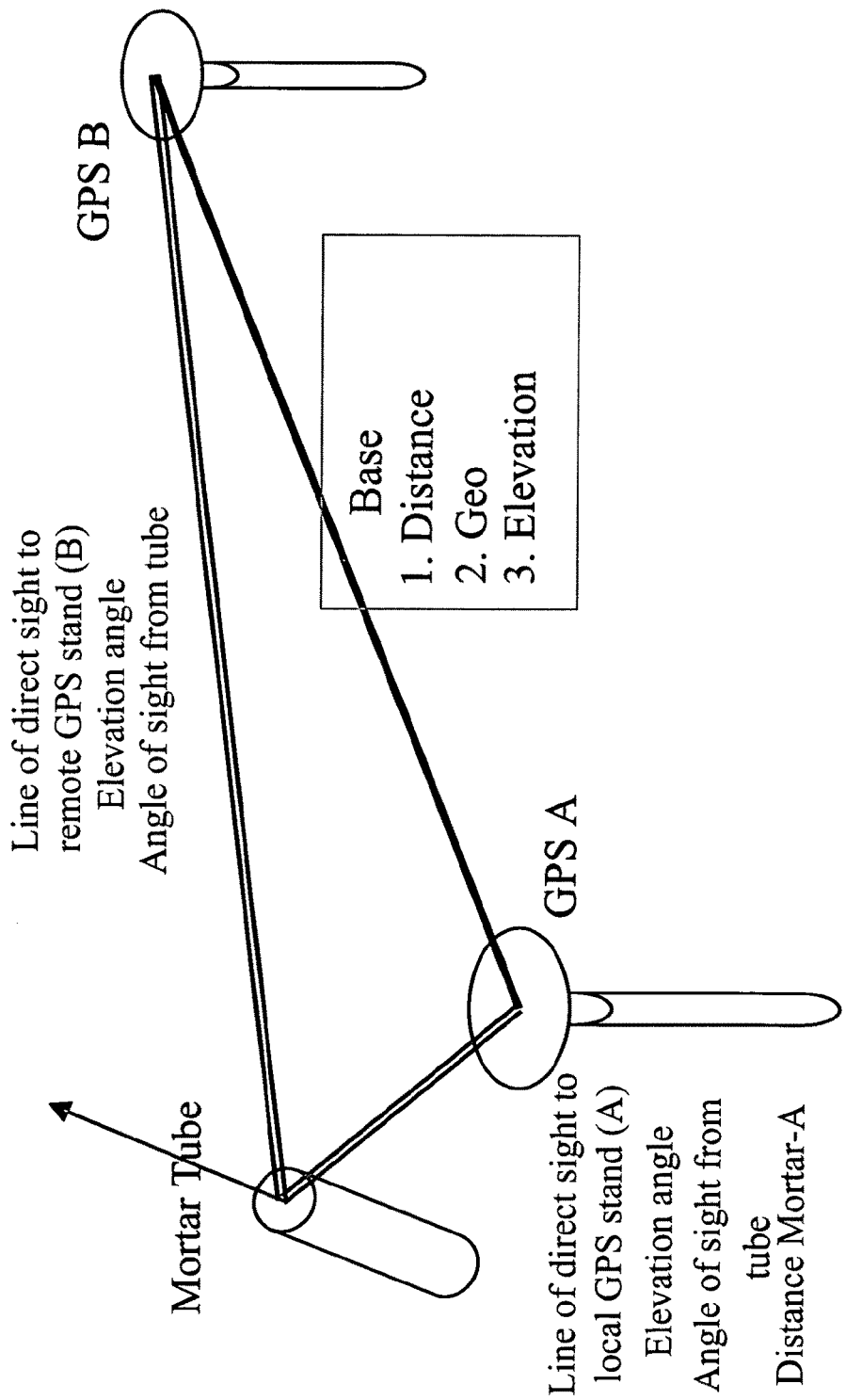
FIG. 4 illustrates the triangulation in a mortar tube azimuth determination.
Figure 5:
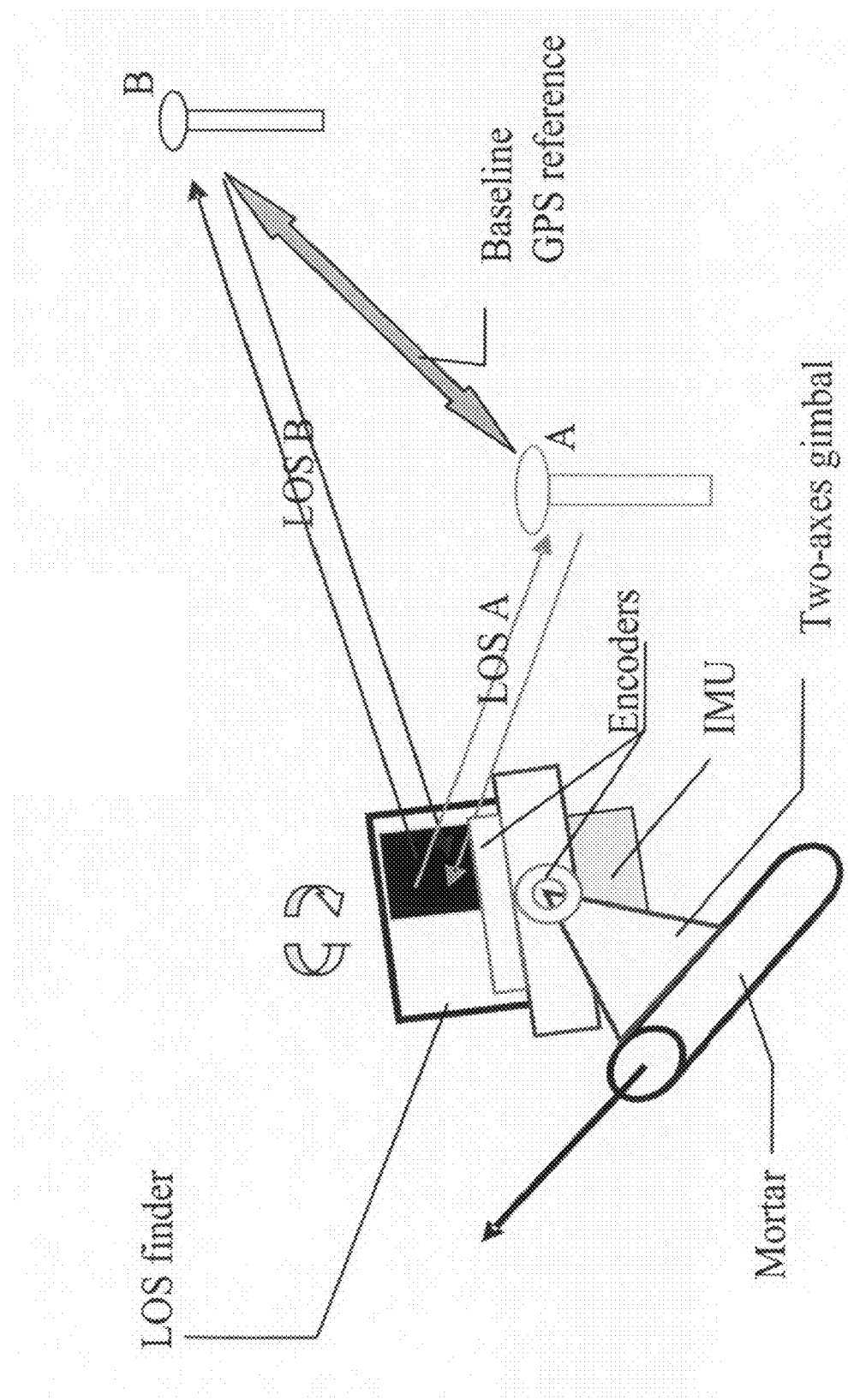
FIG. 5 is a schematic view of the EPD structure.
Figure 6:
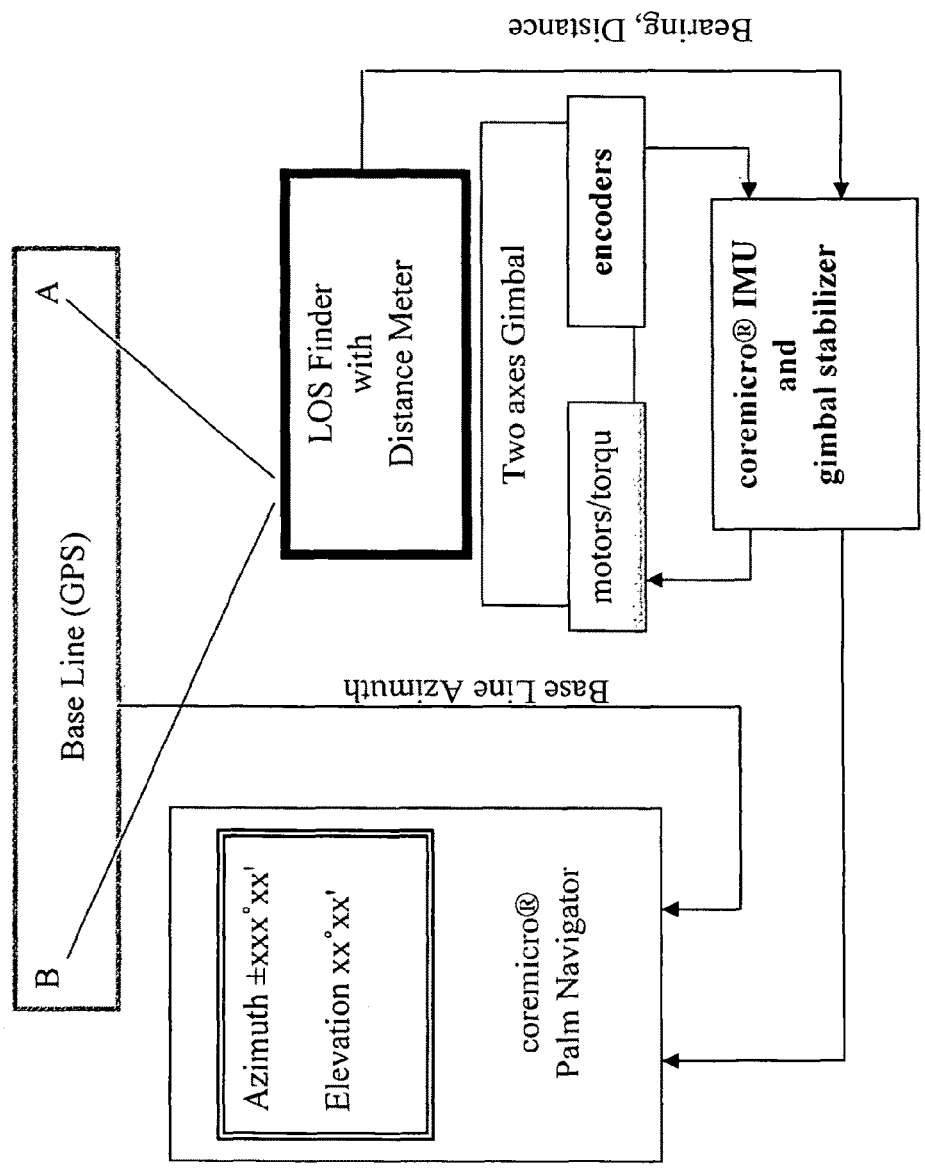
FIG. 6 is a block diagram of the PD System.

This system performs a triangulation on the baseline (created by two-GPS stands) measuring distance and bearing angles to both baseline ends. Baseline data and measurements (FIG. 4) processed with the AGNC Coremicro® Palm Navigator result in the azimuth and elevation angles of the mortar tube being determined. The concept of this approach is presented in FIG. 5 and FIG. 6.

Baseline reference: A number of sources suggest that it is possible to implement a GPS baseline reference with an accuracy (long baseline length) better then 0.25 mil in a few minutes i.e. almost instantly and up to ~1 arc second with in a long time (few hours) surveying [Ashtech product, Promark2]. For the short baseline length (1-2 meters) achievable accuracy is ~0.5 deg in azimuth [GPS compass JRL-10 (Japan Radio Co., Ltd.), Pilot SJ-500, Vector Pro (Koden)] which shows that one needs to expand the baseline length ~100 times to reach required accuracy. Establishing the baseline can more likely be done on a platoon level rather than for each mortar squad. The problem is to provide direct sight access to the baseline ends for each mortar. Once each mortar squad has the baseline in sight the Pointing Device needs to obtain bearing angles and calculate current elevation and heading.

Mortar sight: The sight device attached to the mortar tube is to obtain its bearing angles to the ends of the baseline. The manual version of this devise can be implemented as an optical sight similar to M4, M53 sight units or M64, M67, M109 elbow telescopes utilized in mortar systems. The problem is to incorporate high accuracy encoders similar to the ones, as an example, from "BEI Precision Systems & Space Division Company" (in order to electronically read and transmit data to the Coremicro® Palm Navigator). The next sequential step would be to automate a seek process, holding and stabilizing the sight during the bearing angles measurement with the Coremicro® IMU which makes the block functionally close to a tracking device (for example TM5100A-TDM5005, Leica Geosystems).

The above implementation of the EPD has the advantage of not requiring an inertial grade rate gyro and accelerometers but this is the only advantage. Complexity of the system (due to the need to physically establish the baseline with the direct visibility) and cost inefficiency of the optical sight are disadvantages of this approach.

2.6. IMU with Indexing Device 2.6.1 System Configuration

The problem of attitude determination for a stationary object using inertial instruments can be thought of as a problem of accurate measurements of two physical vector components, namely, the local gravity and the earth's rotation rate. The requirement of ~1-2 mils, i.e., 0.98-1.96 milli-radians in attitude determination, leads to the need in performing acceleration and rate measurements with precision of ~10-3. Thus, the absolute measurement error is not to exceed ~1 mg in acceleration and ~0.01 degrees per hour in the rate.

Figure 7:
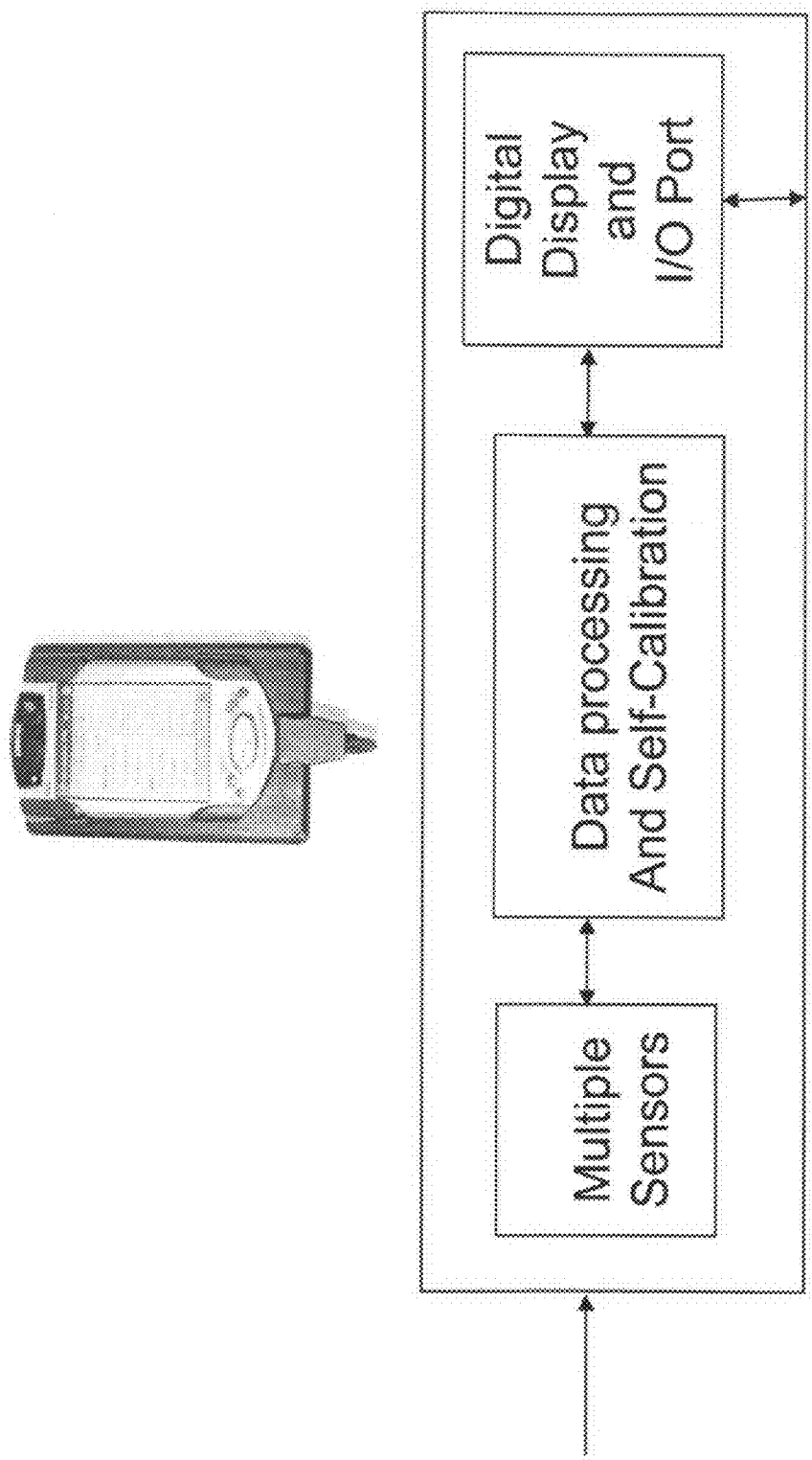
FIG. 7 is a block diagram of the configuration of the EPD based on the Coremicro® Palm Navigator.

A common error for any kind of inertial instrument is a bias. The magnitude of the bias is a primary parameter that defines the cost of the sensor. In this report we consider the minimal configuration (two gyros and three accelerometers IMU) in the indexing device 12 as a sufficient system for the azimuth/heading (North Finding) and elevation/inclination determination for stationary objects. The software part of the system, responsible for the measurements processing, is designed utilizing the Kalman filter methodology. FIG. 7 represents data flow of the Coremicro® Palm Navigator for the EPD.

Figure 8:
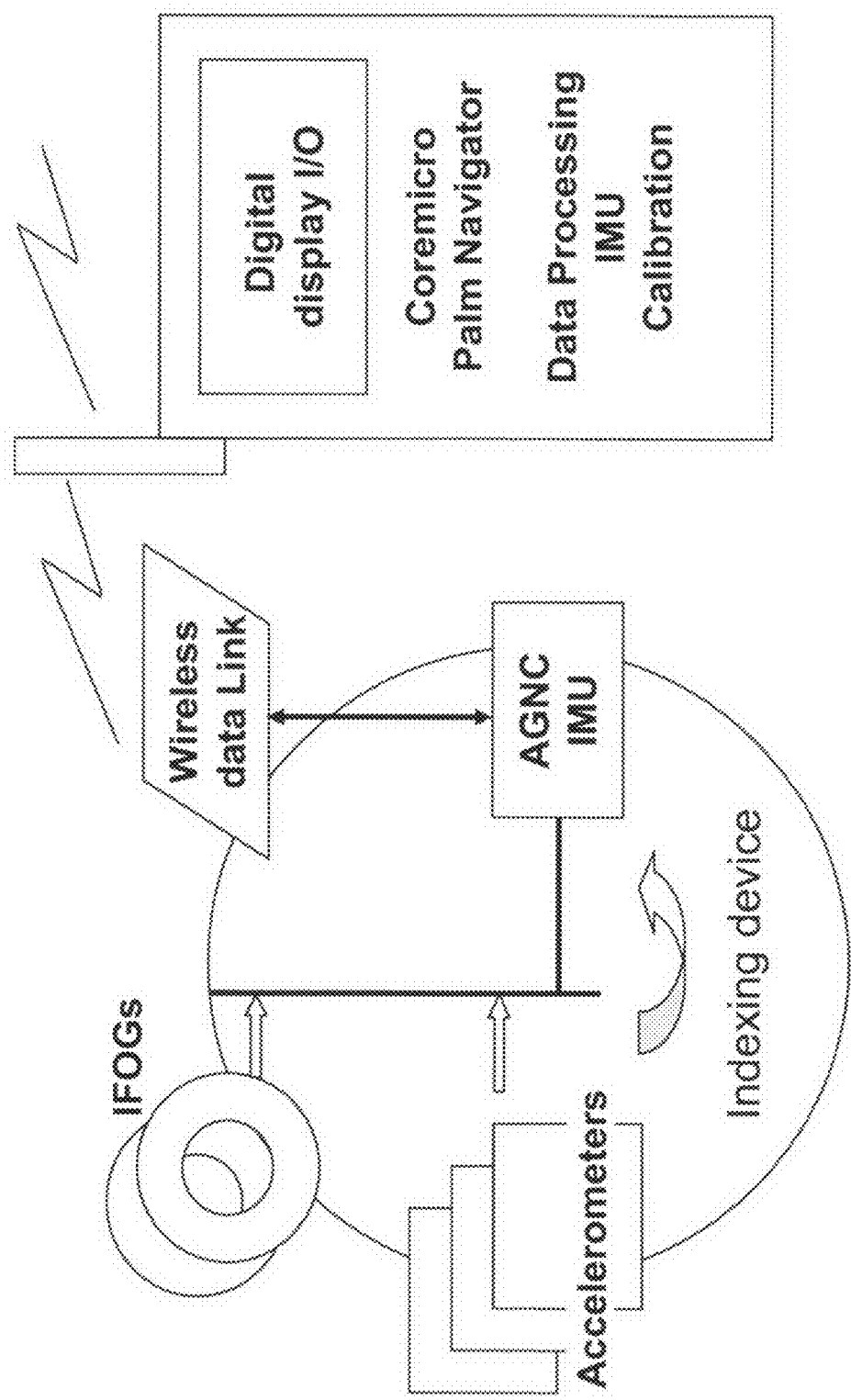
FIG. 8 illustrates the EPD structure and data flow.

The AGNC Coremicro® Palm Navigator controls the turntable position performing sequential indexing, and collects and preprocesses measurements from the gyroscopes and accelerometers. Accumulated data is transferred to the AGNC Coremicro® Palm Navigator. FIG. 8 shows the structure and data flow of the EPD.

The Coremicro® Palm Navigator provides wireless communication with the IMU and platoon command center, processes data from the IMU removing permanent measurement errors and calculates true heading and elevation. The current mortar barrel attitude is displayed and transmitted to the command center.

Figure 9:
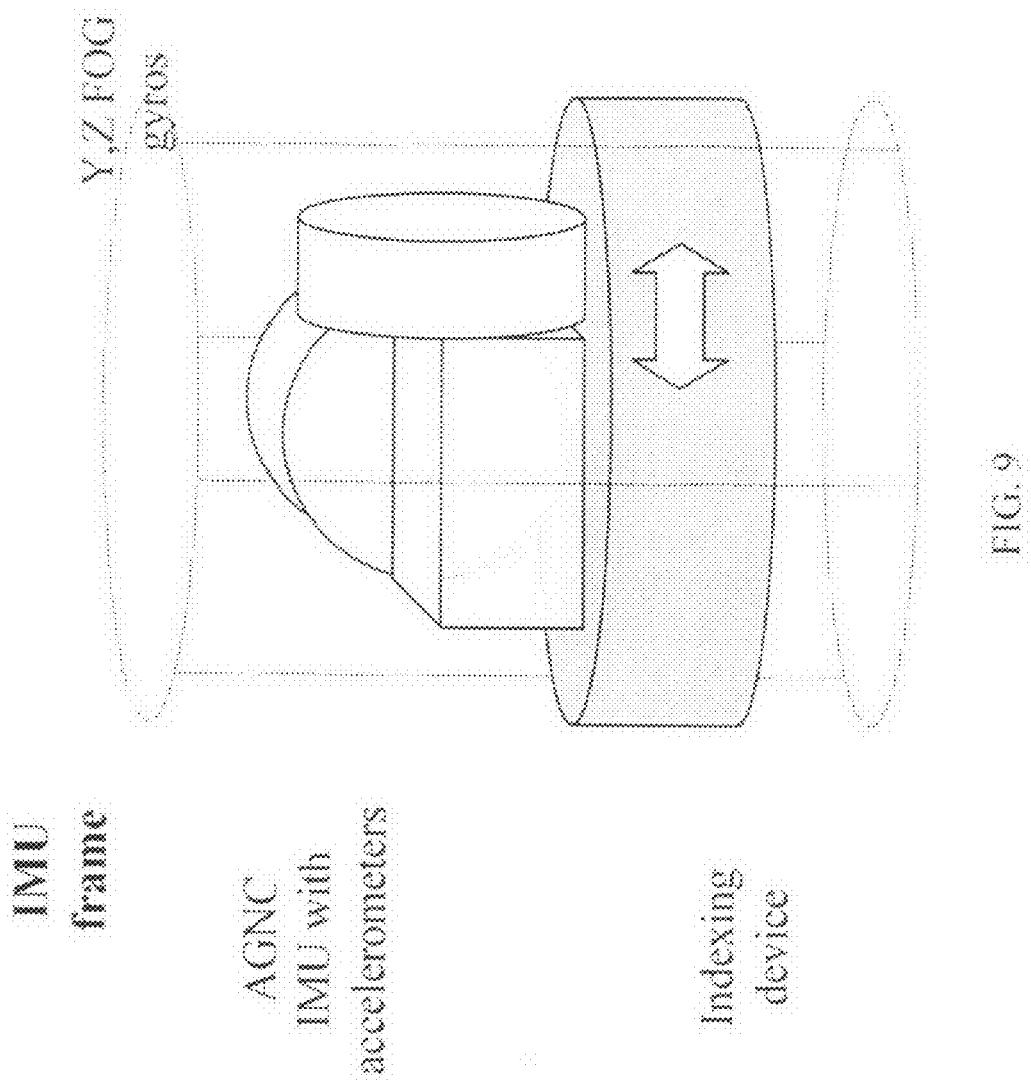
FIG. 9 is a schematic view of the EPD configuration.

FIG. 9 represents the minimal hardware configuration for the inertial attitude determination of the stationary positioned IMU (on the dismounted mortar, for instance, as an Electronic Pointing Device (EPD)).

2.6.1.1. Structure and Performance Requirements

Inertial navigation and attitude determination requires knowing the current acceleration and angular rate vectors of the IMU (three orthogonal components for each vector). A dead reckoning processing algorithm provides the calculation of the increments in the current attitude, linear velocity and coordinates with respect to some initial orientation and position. The navigation on the Earth using inertial measurements is possible after the local gravity and Earth angular rate vectors are defined (i.e. the initial trihedral on the Earth is set) and IMU sensitivity axes are aligned with respect to this initial coordinate system.

For the stationary IMU position the alignment process is actually the measurement of the Earth rate and gravity vectors projection onto the IMU sensitivity axes. Three angles: the azimuth, elevation and roll uniquely define the two physical vectors projection on the IMU axes and vice versa. Indeed the Earth rate value is known (15.04 deg/hr) and thus, the two components of this vector along with the gravity vector components (accelerometers measurements) allow the determination of the IMU orientation with respect to the Earth.

The AGNC IMU is a main component of the EPD IMU. The two rate gyroscopes residing on the turntable (indexing device 12) are the inertial sensing components to provide the gyrocompassing. The indexing device 12 serves for the self-calibration of the IMU inertial sensors and allows removing the major gyro and accelerometer errors-biases.

The AGNC IMU:
Establishes the electronic interface with inertial sensors,
Performs data collection and pre-processing,
Controls the indexing device 12 in self-calibration cycles,
Wirelessly transmits reduced data to the Coremicro® Palm Navigator.

The range of measurements is chosen to provide continuous attitude determination during the dismounted mortar relatively slow targeting (heading and elevation adjustment). The short term stability and noise requirements are imposed by the available time, ~60 sec, for the accurate enough attitude determination. The bias limit is chosen as a reasonable number among the tactical grade inertial sensors (FOG or DTG type) and does not exceed a few orders of the short term stability magnitude. The models and parameters aid the analysis for the typical conditions or the EPD application.

Figure 10:
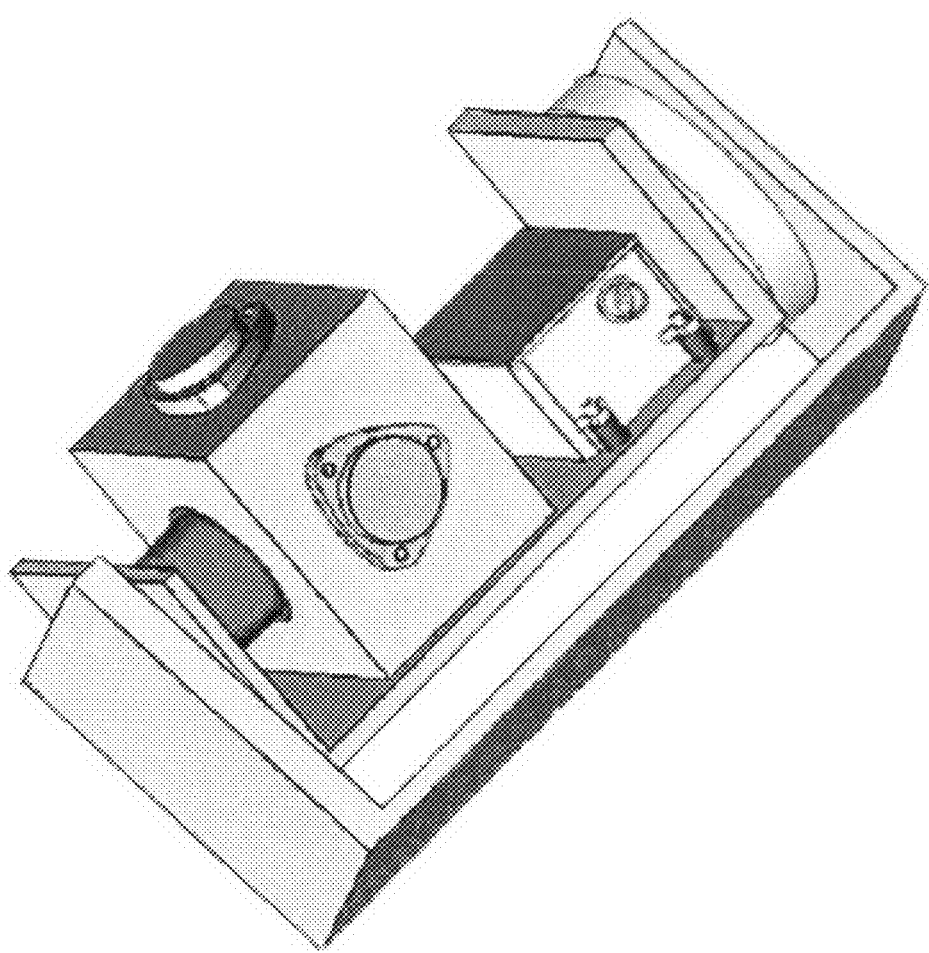
FIG. 10 is a perspective view of the IMU and inertial sensors in the indexing device.

The IMU configuration with the indexing device 12 is illustrated in the FIG. 10.

The IMU controls the turntable position during the calibration cycle. The stepper motor through the gear transmission rotates the inertial sensors about the mortar barrel axis.

2.6.1.2. DTG-FOG Comparison

The FOG type of gyro promises the lowest G-sensitivity in measurements and reasonable ratio between a bias and its short term stability. The advantage of using the DTG type of gyro is a small size and lower cost per axis but the price for that is an order of bias magnitude and critical G-sensitivity. In addition the DTG needs to be supplied with rebalance electronics in order to work as a rate sensor.

The alternative choices in a system implementation using FOG or DTG are based on careful consideration and weighting of the EPD size and cost on the one hand and attitude determination time and accuracy on the other. For the EPD this is a cost-accuracy dilemma. For civilian applications, such as down-hole surveying, it would be a size-time one. This careful consideration is done taking into account the noise properties of the output signal for both types of gyro. The noise of the FOG and DTG has a different nature, model and parameters. It needs to be analyzed under the typical conditions for the EPD applications. Modeling and simulation of EPD performance with different sources of measurement errors and noise parameters allows making the right decision about the rate sensors utilization in the EPD.

For the AGNC requirements the range of measurements is chosen to provide continuous attitude determination during the dismounted mortar relatively slow targeting (heading and elevation adjustment). The short term stability and noise requirements are imposed by the available time of ~60 sec for accurate enough attitude determination. The bias limit is chosen as a reasonable number among the tactical grade inertial sensors (FOG or DTG type) and does not exceed a few orders of the short term stability magnitude.

The FOG type of gyro promises the lowest G-sensitivity in measurements and reasonable ratio between a bias and its short term stability. The advantage of using the DTG type of gyro is a small size and lower cost per axis but the disadvantage is an order of magnitude higher bias and critical G-sensitivity. In addition the DTG needs to be supplied with rebalance electronics in order to work as a rate sensor. The noise of the FOG and DTG is of different nature. The model and parameters need to be analyzed for the typical conditions of the EPD applications.

The ANSI/IEEE Std 813-1988 "IEEE Specification Format Guide and Test Procedure for Two-Degrees-of-Freedom Dynamically Tuned Gyros" defines the random drift term and evaluation procedure for this parameter. The short term stability parameter commonly used to characterize rate gyro accuracy has the same meaning by definition. This is why we can substitute the DTG random drift value for the bias short term stability in Table 1. Eventually the bias stability needs to be verified with a particular DTG ATP (Acceptance Test Procedure) and tested during the gyro validation for the EPD application.

2.6.2 Indexing Procedure 2.6.2.1. Bias Calibration Concept and Gyro Error Sources The Concept The idea of the calibration procedure for the stationary positioned IMU is based on the fact that 180 degrees turn reverses the sensitivity axis direction and the ideal measurement of the rate changes sign. The discrepancy in the measured value for the opposite direction indicates signal bias.

Figure 11:
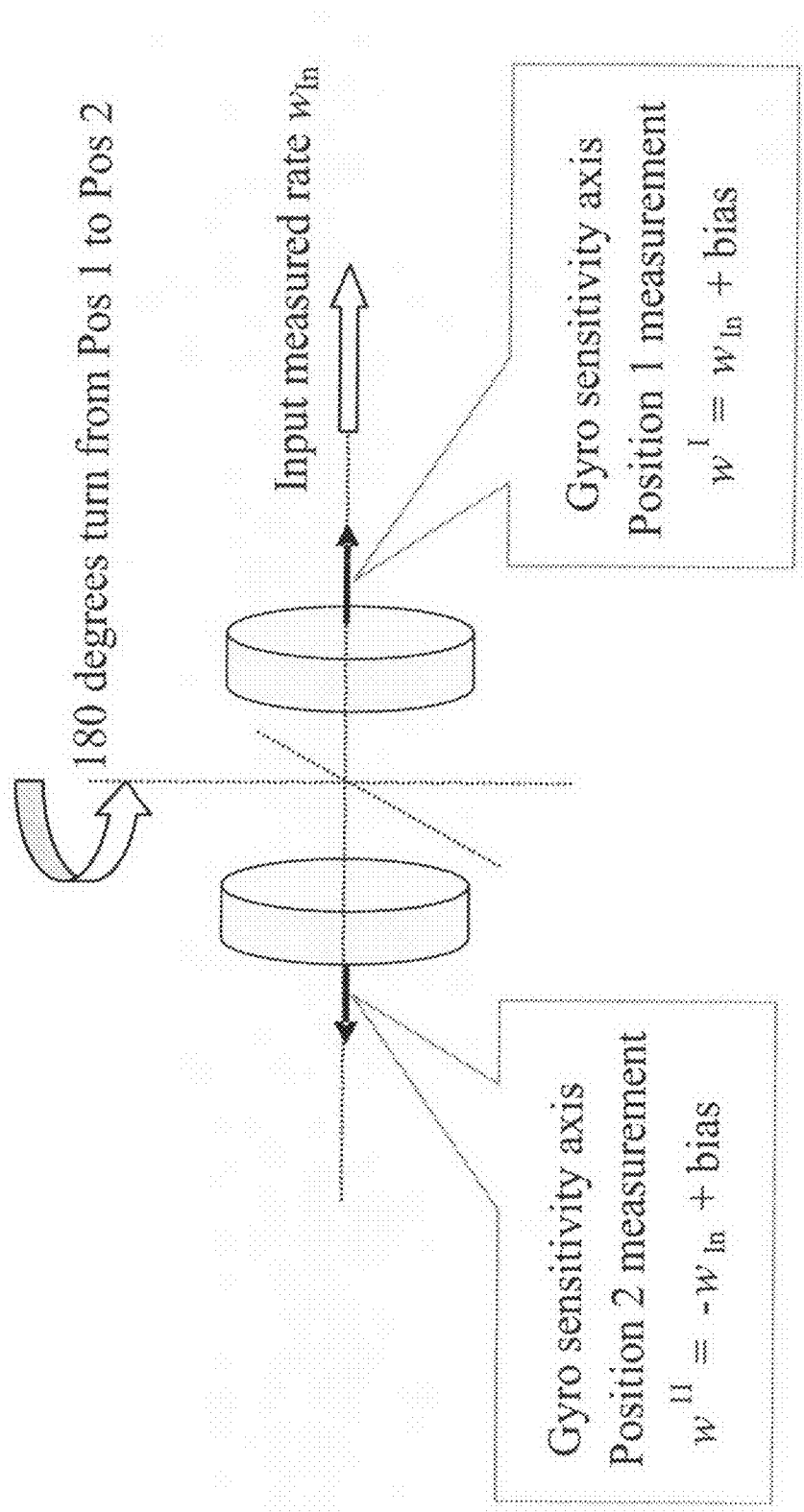
FIG. 11 illustrates the instrument bias calibration concept.

As illustrated in FIG. 11 the two positions of the gyro provide the reverse of its sensitivity axis. Thus position 1 gives the measurement as a sum of the input rate and bias, whereas in position 2 the input rate has the opposite sign. Therefore, the average of the measurements in two positions, 180 degrees apart, gives us the bias value and the difference between those measurements is a doubled input rate.

The Bias Short Term Instability

The time interval τ between two measurements (at the different positions) entails the possibility for the bias change. If this takes place the average of the two measurements would give us:

$$\frac{w^I + w^{II}}{2} = \text{bias} + \frac{\Delta(\tau)}{2}$$

and the difference is:

$$w^I - w^{II} = 2w_{In} - \Delta(\tau)$$

Thus, the measurement accuracy after bias removal is $$\sim \frac{\Delta(t)}{2}$$

i.e. half of the possible bias change during the time interval between measurements in the two different positions. (For the EPD we look for ~0.01 deg/hr/min stability). This parameter typically is represented in a gyro specification as "in run stability" (FOG) or "random drift" (DTG). For example, we assume a FOG has ~0.1 deg/hr (during 1 hr, 5 min averaging) in-run stability and the DTG is characterized with a ~0.01-0.02 deg/hr random drift.

Temperature Sensitivity

One of the primary reasons for the bias change in time is temperature variation. We can determine the bias temperature sensitivity parameter in a gyro specification. For example if the FOG and DTG have ~0.1 deg/hr/deg-C bias temperature sensitivity then for the EPD we can not allow a temperature variation during the calibration cycle (~1 min) of more than 0.1° C. The other way around this problem is to apply temperature compensation using the thermal model supplied with the gyro or derived as part of the gyro evaluation. Using thermal modeling and compensation reduces, typically, the temperature sensitivity (residual errors) by 10-100 times.

Random Noise

The output signal noise restricts the measurement accuracy. During the calibration time interval the random bias deviation can be treated as a possible bias change. A commonly used parameter to characterize this kind of instability is an angular random walk (ARW).

Note: in order to reach heading accuracy ~1 mil less than in 1 min we need to have the inertial sensor angular random walk under the 0.002 deg/√hr. So the noise property of the FOG in the EPD is one of the major concerns.

The G Sensitivity

The G-sensitivity is one of the disadvantages using a DTG compared with a FOG. During the calibration cycle we change the gyro orientation with respect to the local gravity vector. As a result the gyro bias we try to compensate can jump from one turntable position to the other in the range of a few deg/hr. Using the four position indexing (90 degrees turn) instead of the two (180 degrees turn) we have the capability to estimate some components of the G-sensitive bias error and to restrain this kind of error. Along with a temperature compensation we probably can reduce the G-sensitive error up to 0.2-0.05 deg/hr (for the given example DTG.).

The farther improvements (once again we need to keep bias uncertainty under ~0.01 deg/hr) may be achieved if the G-sensitivity errors have some symmetrical property. In fact we do not change during the calibration cycle the spin axis component of the "g" projection which is the IMU (mortar barrel) longitudinal one. So our primary concern is the bias G-sensitivity to the radial "g" projection. Due to the DTG symmetrical design we can expect that the difference between the G sensitivity to the acceleration along the sensitivity axis and in a cross direction (radial-rotor spinning plane) would be under ~0.01 deg/hr/g. This is our requirement (Table 3—residual G sensitivity) and it needs to be evaluated with the real DTG.

2.6.2.2. Calibration Cycle

Figure 12:
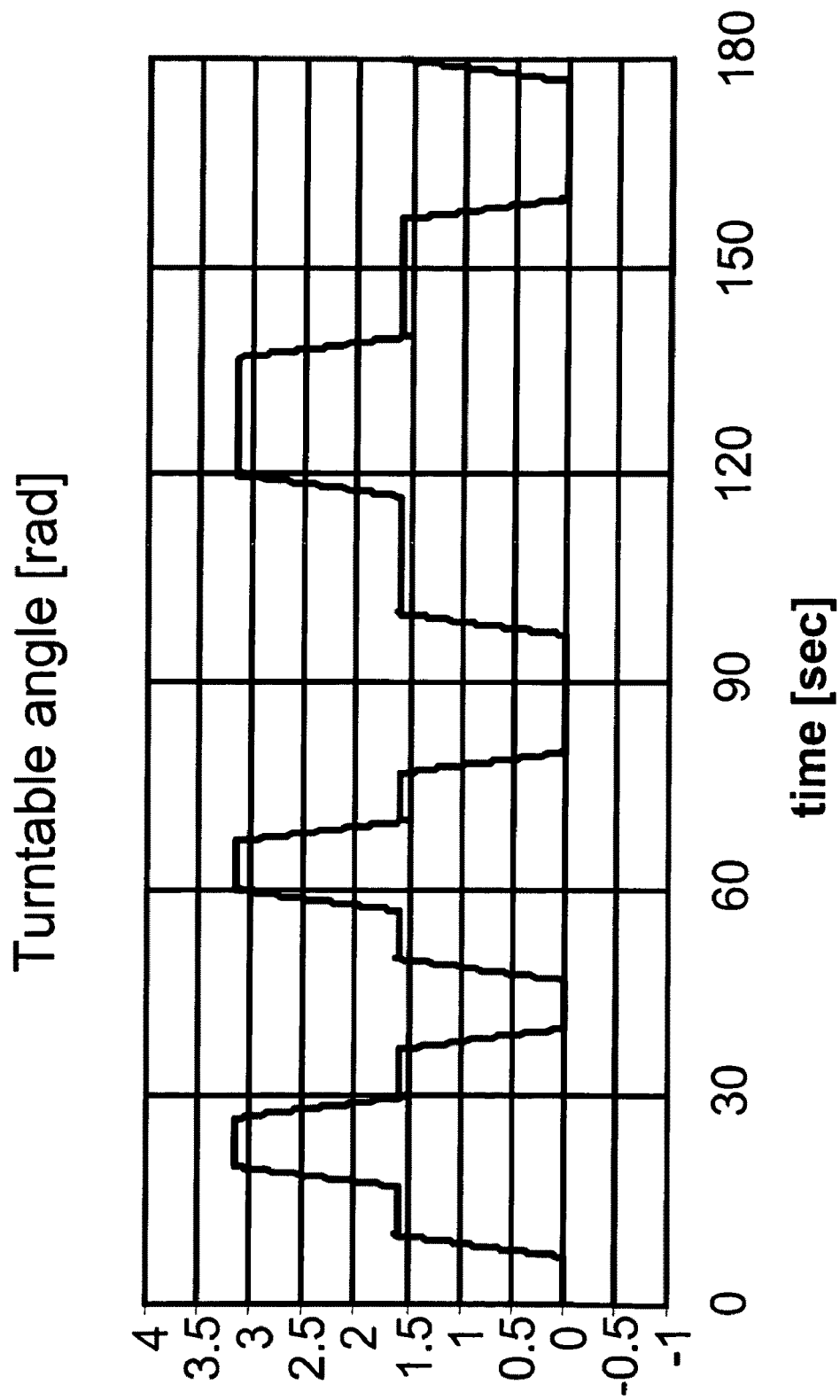
FIG. 12 is a diagram of the calibration cycle.

The calibration procedure for the stationary positioned IMU is based on the fact that a 180 degrees turn reverses the sensitivity axis direction and the ideal measurement of the rate or acceleration changes sign. The discrepancy in the measured value for the opposite direction indicates signal bias or perhaps non-linearity. A sequential turn of 90 degrees, as shown in FIG. 12, allows elimination of bias and asymmetry in measurements and to relax requirements for the inertial sensors.

The typical turntable calibration cycle is:

7 sec stationary position, 3 sec transition to the next 90 degrees apart angular position The axis of turn with respect to the mortar barrel is the roll axis.

The sequence of the stationary positions is as follows:

0, 90, 180, 270, 180, 90, 0, . . . degrees of the turntable position

The indexing timing provides a full calibration cycle in less then 60 seconds which is the desirable time for the first attitude determination after powering up the IMU. The sequence of the turntable positions in a calibration cycle is chosen to provide the four positions 90 degrees apart and to restrict the range of the turntable angular evolution within 0-270 degrees. This restriction is important for the hardware design and eliminates the need to use slipper rings. One can use a flexible cable instead for the electrical connection.

The actual calibration cycle duration can vary depending on the current uncertainty in bias estimation. Once the inertial sensors biases are estimated accurately enough it is reasonable to slow down the calibration cycle reducing the power consumption and the additional errors introduced during the transition from one position to the other. The only limitation here is a bias deviation (short time instability).

The turntable position needs to be known within ~0.5 mrad for all indices (0, 90, 180 and 270 degrees). The current position during the transfer from one stationary position to the other has to be known with minimum possible uncertainty.

2.6.3 Data Processing Algorithm and Simulation Results

The main focus in the algorithm design and implementation for the EPD is a combination of the Kalman filter data processing and turntable control algorithm. The Kalman filter provides the current estimation of the azimuth and elevation angle (along with biases and other observable inertial sensors errors) minimizing, in general, the error dispersion of the estimated parameters. The limit of this minimization like for any filtering process depends on the signal-to-noise ratio. As applied to the data processing in the EPD, the minimal level of the residual errors depends on the turntable control algorithm. Indeed, if we do not move the turntable at all we are not able to calibrate and compensate measurement error. If we move the turntable continuously the uncertainty in its current position and some dynamic errors are introduced and could prevent us from sufficiently accurate parameter estimation. Therefore, there is some optimum motion profiling.

The Kalman filter algorithm provides us with optimal biases and current attitude estimation including azimuth and elevation determination. This part of the software works independently from the indexing device 12 servo control and effectively filters out the measurement noise and random deviations. In general the transient process in a Kalman filter can be adjusted to the desirable behavior by choosing its parameters, such as, correlation matrix of the measurement errors and correlation matrix of the state vector deviations. The limitation here is the ability to filter out real measurement noise and to follow the slow changes in the estimated variables. The initial uncertainty in the estimated parameters is essential for the transient especially for the non-linear system. Here and below we assume that the initial discrepancy between the real and estimated angles is ~10 degrees and the inertial sensors biases to be estimated are ~10 mg for the accelerometers and ~1.5 deg/hr for the gyros.

2.6.3.1. Simulation Model

The simulation model is composed of two parts. The first part provides the full simulation of the measurements. The current biases and attitude along with the random biases and angles (azimuth, elevation, roll and turntable position) deviations are all taken into account to produce sequential series of measurements. The turntable position is simulated as a sequence of 0, 90, 180, 270, 180, 90, 0 degrees turn. The second part of the simulation model takes simulated measurements as an input and calculates current estimation of the inertial sensor biases, azimuth, elevation and roll angles.

Figure 13:
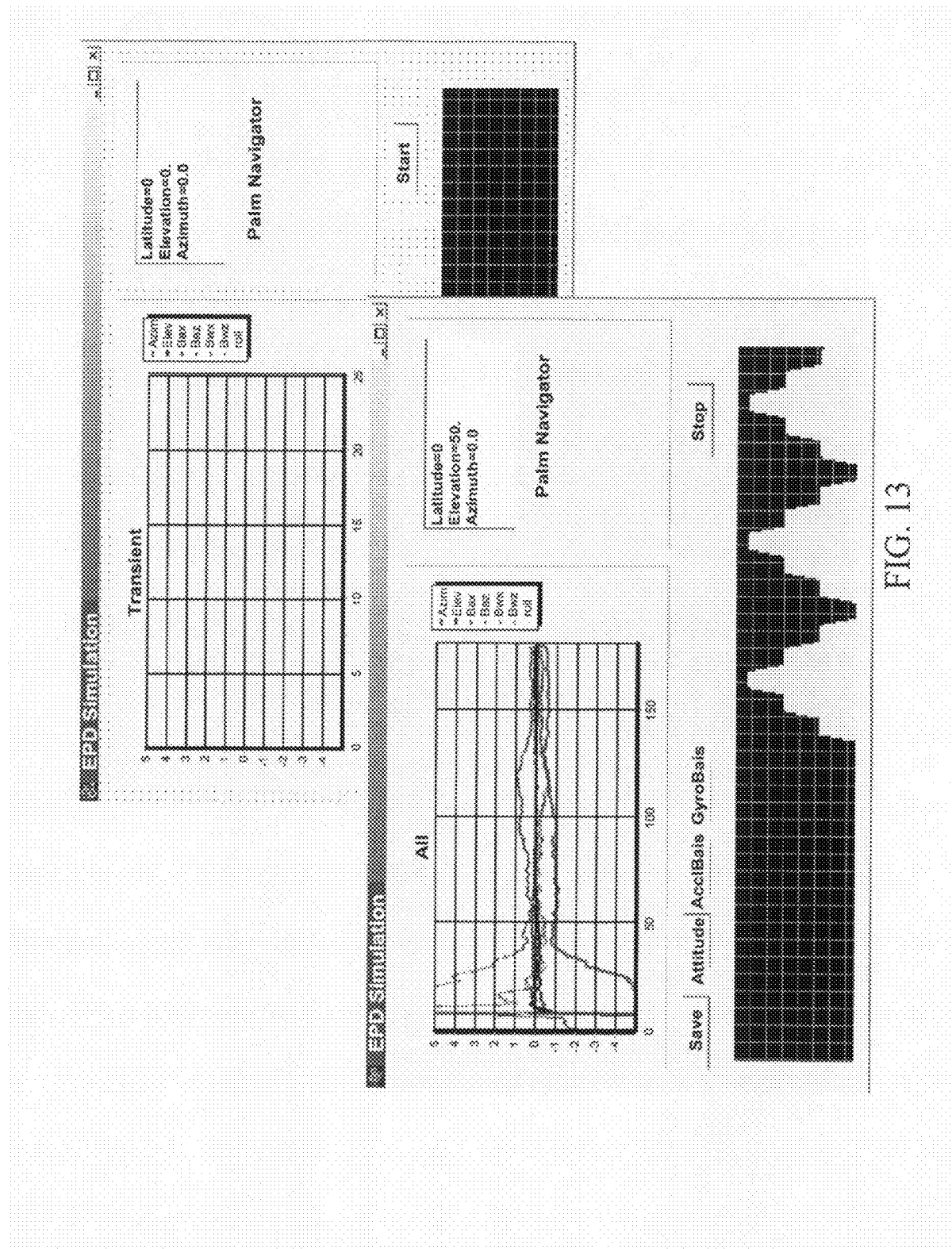
FIG. 13 is a perspective view of the simulation program GUI.

The GUI of the simulation program is depicted in FIG. 13. The result of the simulation is presented in a chart as a transient of the attitude determination and biases estimation.

2.6.3.2. Transient

The Kalman filter algorithm provides us with optimal biases and current attitude estimation including azimuth and elevation determination. This part works independently from the indexing device 12 servo control and effectively filters out the measurement noise and random deviations.

In general the transient process can be adjusted to the desirable behavior by choosing its parameters, such as, correlation matrix of the measurement errors and correlation matrix of the state vector deviations. The limitation here is the ability to filter out real measurement noise and to follow the slow changes in the estimated variables.

Figure 14:
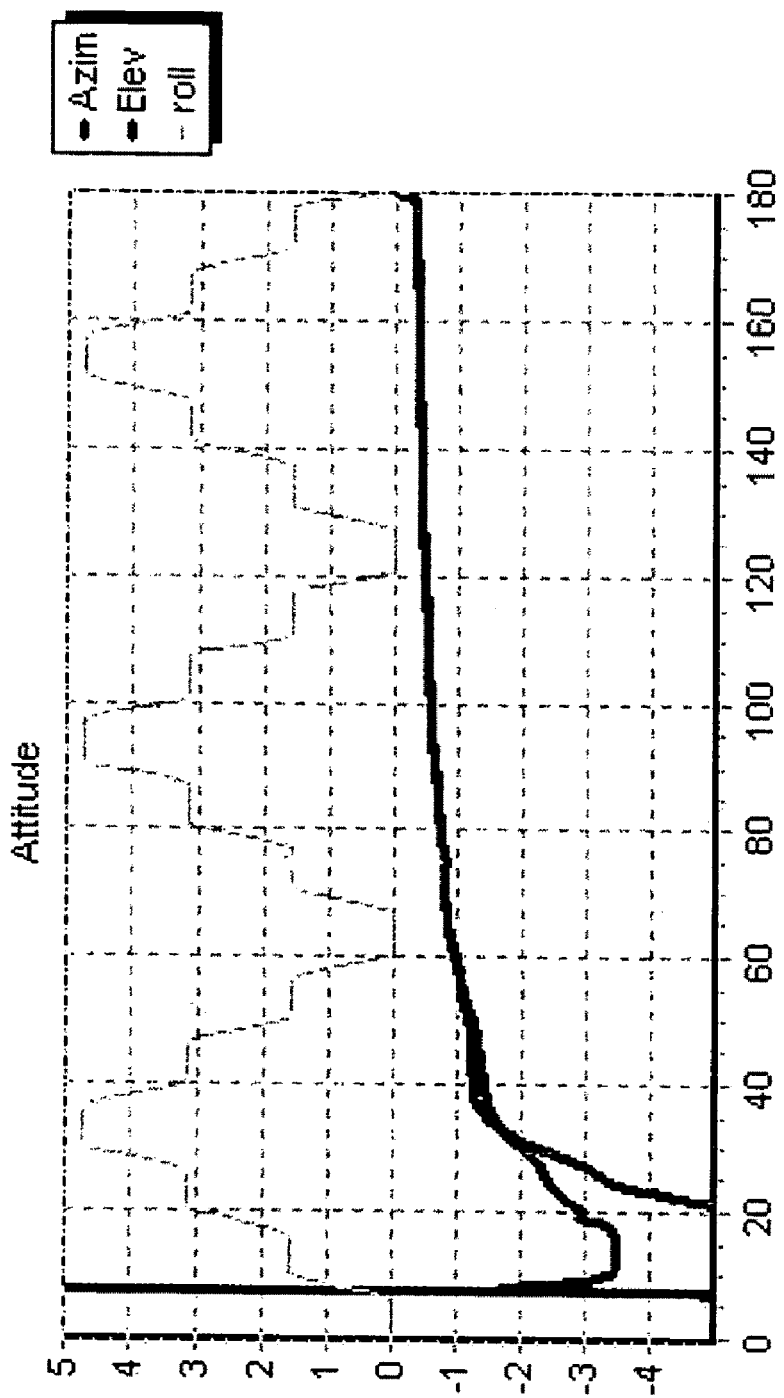
FIG. 14 illustrates a diagram of the azimuth and elevation estimation.

The initial uncertainty in the estimated parameters is essential for the transient phase especially for non-linear systems. Here we assume that the initial discrepancy between the real and estimated angles is ~10 degrees and that the inertial sensors biases to be estimated are: ~10 mg and ~10 deg/hr (for the accelerometers and gyros respectively.) The typical transients (FIGS. 13, 15) are simulated with no error in the current turntable position. The transient process in the attitude determination is depicted in FIG. 14.

The transient process takes ~1 min to reduce the estimation error from 10 degrees to 1 milli-radian. The piecewise shape is due to the indexing profile in a calibration cycle (the yellow line in the figure).

Figure 15:
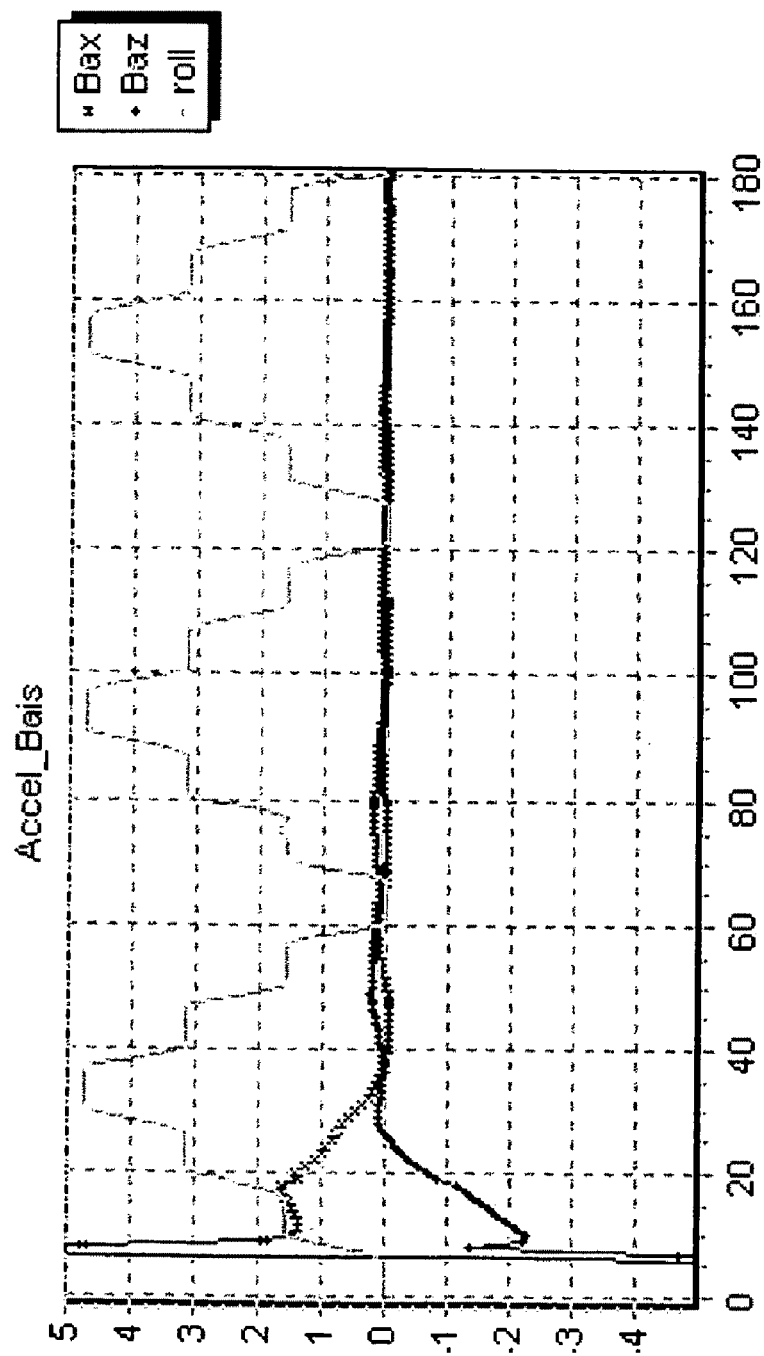
FIG. 15 illustrates a diagram of the accelerometer biases estimation.

The process in accelerometer biases estimation is shown in FIG. 15.

As we can see the estimation error goes down from ~10 mg to 0.5 mg in less than 60 seconds. The next chart (FIG. 16) shows the transient in gyro biases estimation. The initial error ~5-10 deg/hr is reduced to under ~0.015 deg/hr in less than 60-70 seconds.

This process as well as the accelerometers biases estimation runs at the same time with the attitude determination.

2.6.3.3. Indexing Errors

The biases and attitude estimation process tends to converge to the accurate value mostly during the transition of the turntable from one position to the other. In other words the estimation process relies on the turntable position change that gives actually the observability for the biases and attitude simultaneous estimation as described in Chapter 1. Any uncertainty in the turntable position leads to estimation errors. The most sensitive stage of the estimation process is the transition of the turntable from one position to the other when the uncertainty in its position is relatively large.

Figure 17:
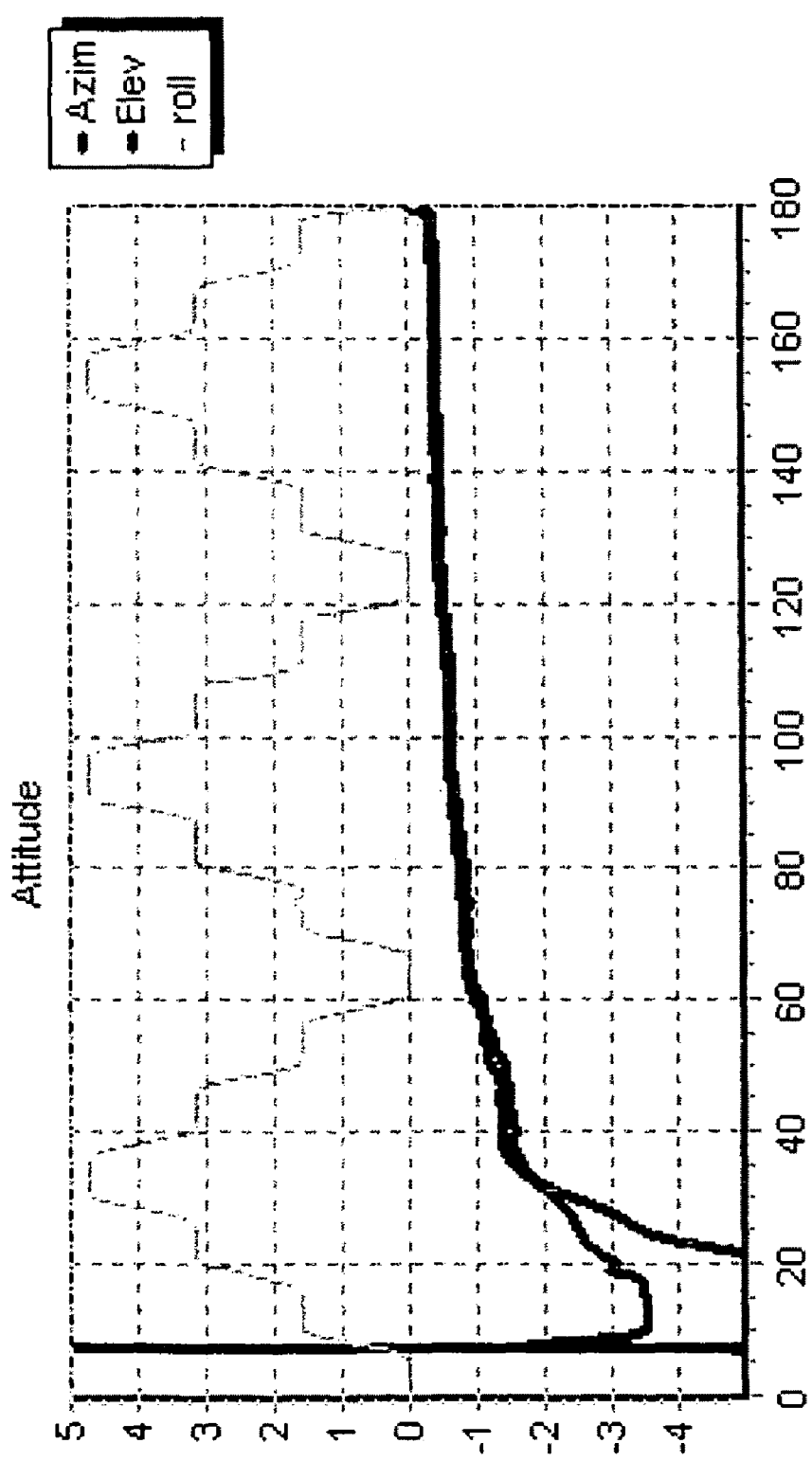
FIG. 17 illustrates a diagram of the attitude determination with 1% turntable rate uncertainty.
Figure 18:
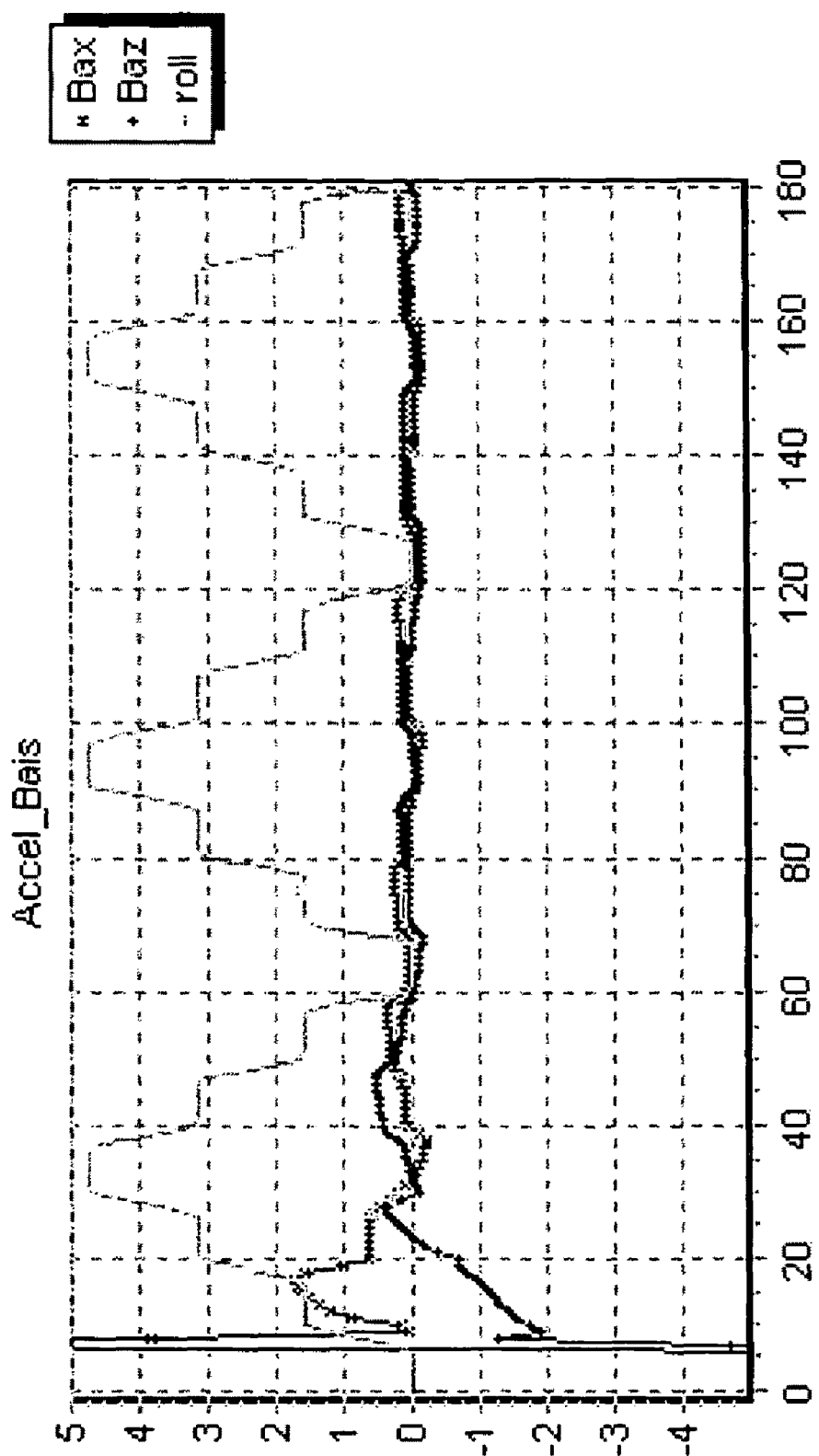
FIG. 18 illustrates a diagram of the accelerometer bias estimation (1% turntable rate error).
Figure 19:
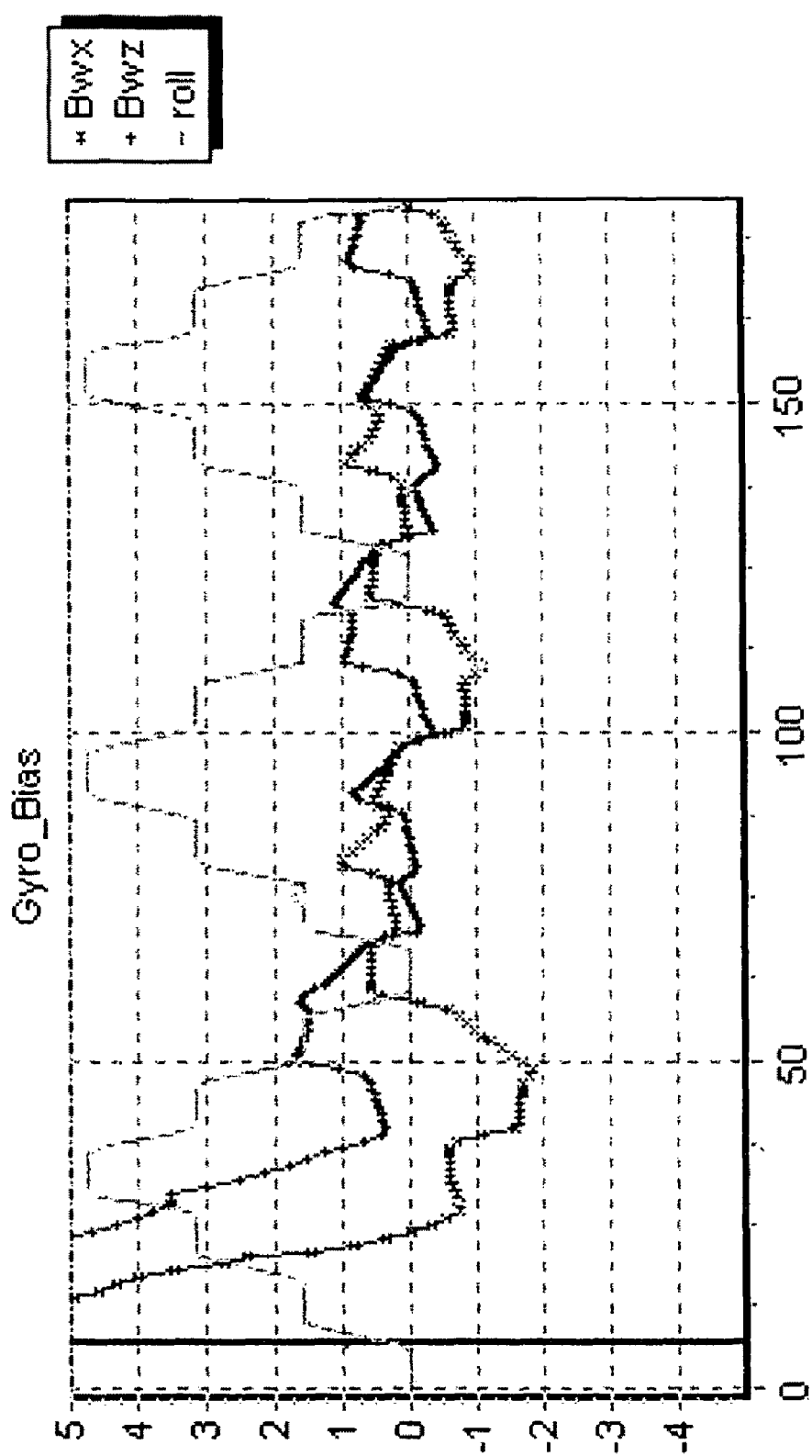
FIG. 19 illustrates a diagram of the gyro bias estimation (1% turntable rate error).

Considering the error in a turntable rate of ~30 deg/sec to be ~1% we get the simulation results for the biases estimation as shown in FIG. 18 and FIG. 19. The azimuth and elevation estimation process (FIG. 17) has a very small distortion.

Thus ~1% accuracy in the turntable rate during the transition from one position to the other is a good enough level for an accurate ~1-2 mil attitude determination.

Figure 16:
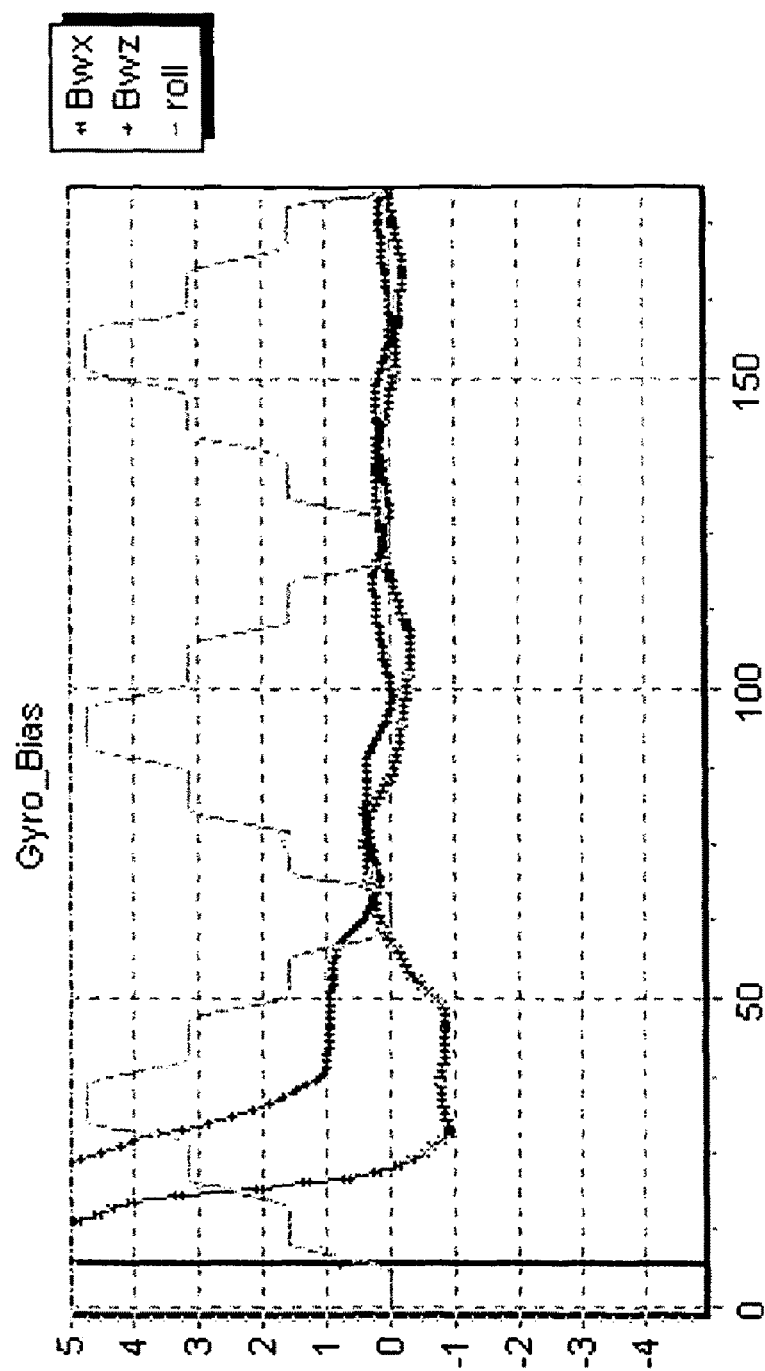
FIG. 16 illustrates a diagram of the gyro biases estimation.

The disturbance in the accelerometer bias estimation does not exceed ~1 mg (compare FIG. 15 and FIG. 18) and in the gyro bias case it is less than ~0.01 deg/hr (see FIG. 16 and FIG. 19)

The results of this simulation comply with the following rough estimation. During the transition the turntable changes the position by 90 degrees. The 1% error gives us the average uncertainty in the current roll angle of ~0.45 degree i.e. ~7.5 mrad. During the calibration cycle of ~1 min this error is reduced by the ratio between the transient time and the stationary interval which is ~0.3 (7 sec stationary position and 3 sec transition). Therefore, the effective average error due to the ~1% turntable rate uncertainty is ~2.2 mrad. During the calibration cycle the turntable changes the direction of the rotation (CW—from 0 to 270 deg and CCW—from 270 to 0 deg). Thus, the error in the roll angle goes back to zero once we return to the start/initial position. Now we can treat the derived effective error of $~2.2 \cdot 10^{-3}$ as a relative error of the Earth rate and gravity measurements that finally gives ±1 mg and ±0.015 deg/hr range in bias estimation. The attitude determination is almost intact because the Kalman filter assumes the azimuth and elevation to be constant (static mortar position) and keeps looking for the possible bias change.

2.6.3.4. Measurement Noise

Figure 20:
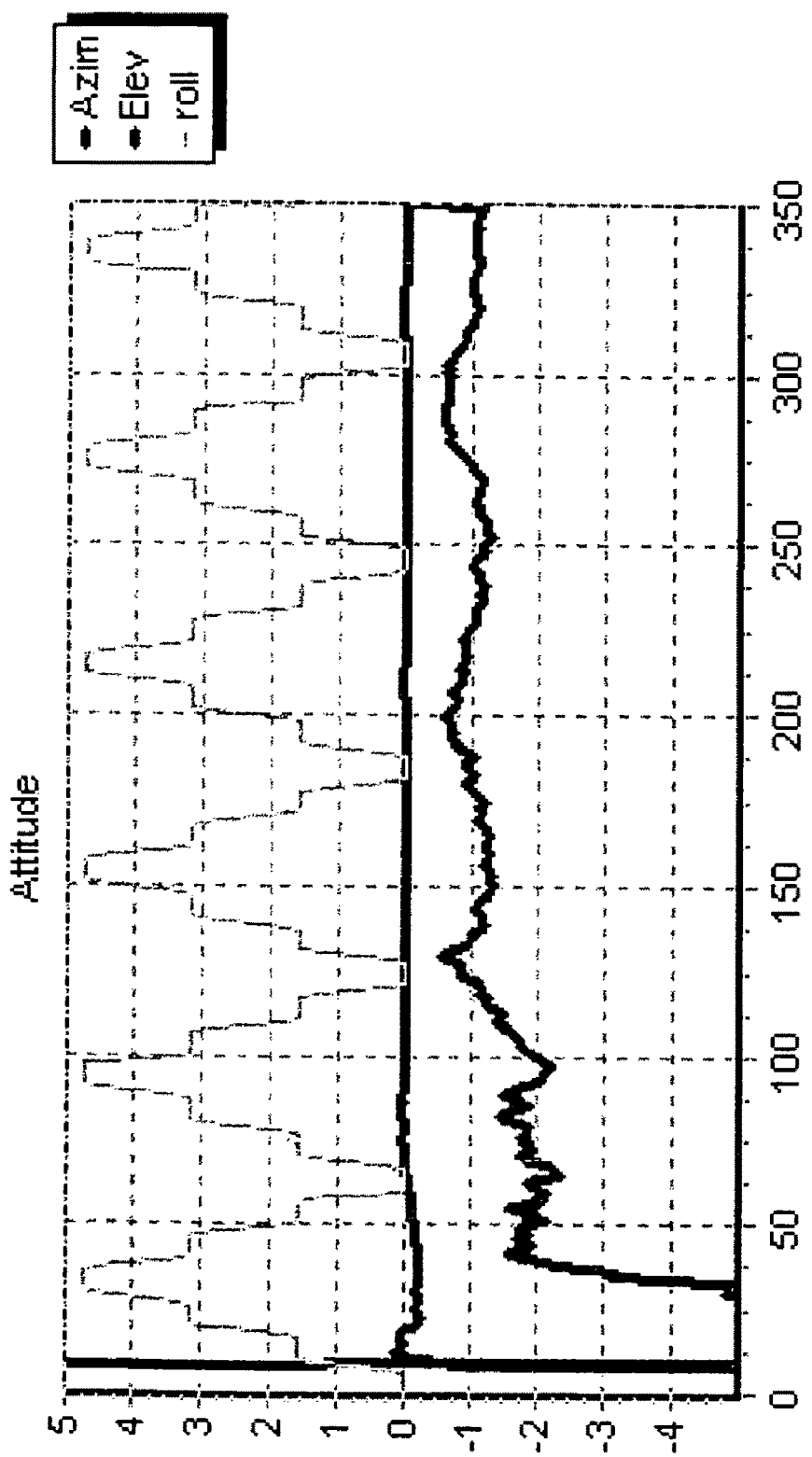
FIG. 20 illustrates a diagram of the azimuth determination transient at 0.005 deg/√hr gyro noise.

The measurement random noise level determines the time needed for the accurate attitude determination. Considering the gyro noise ~0.005 deg/√hr (as specified for the FOG-600) the transient in the attitude determination is shown in FIG. 20.

Figure 21:
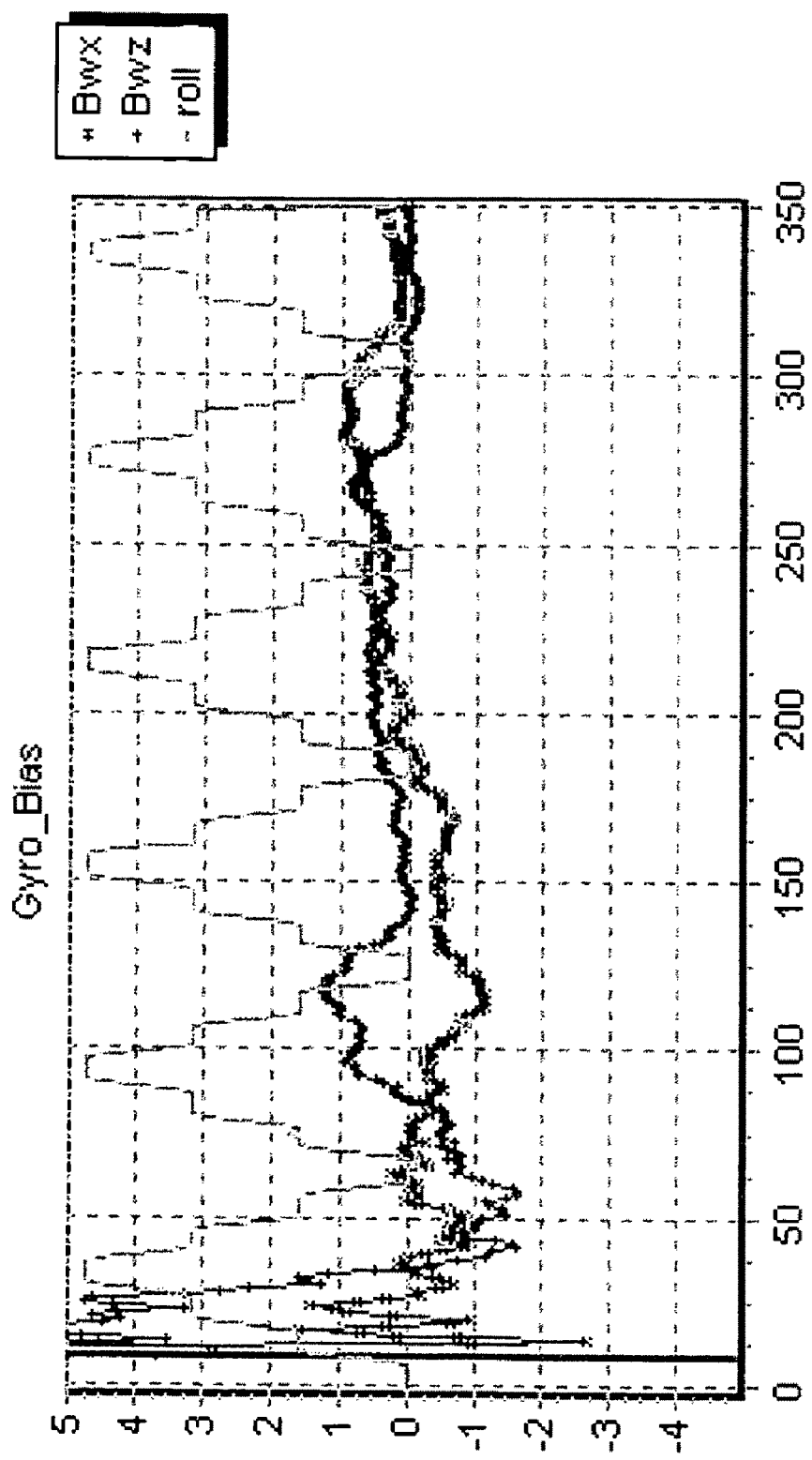
FIG. 21 illustrates a diagram of the gyro bias estimation at 0.005 deg/√hr measurement noise.

The process is extended over the 3-5 min due to the gyro bias estimation errors as shown in FIG. 21.

Figure 22:
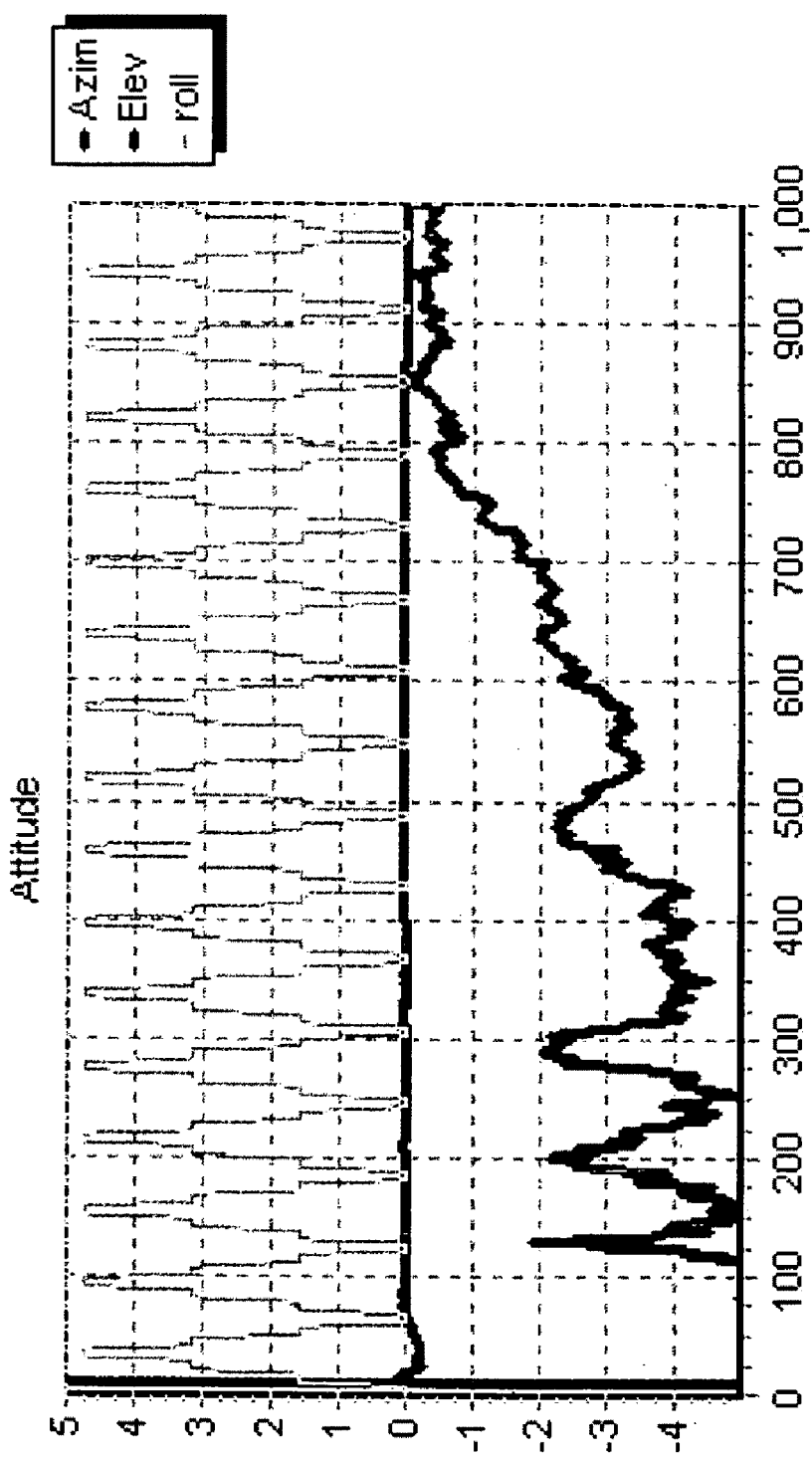
FIG. 22 illustrates a diagram of the azimuth determination transient at 0.02 deg/√hr gyro noise.

The corresponding transients are shown in FIG. 22 for the noise level 4 times more: ~0.02 deg/√hr.

Figure 23:
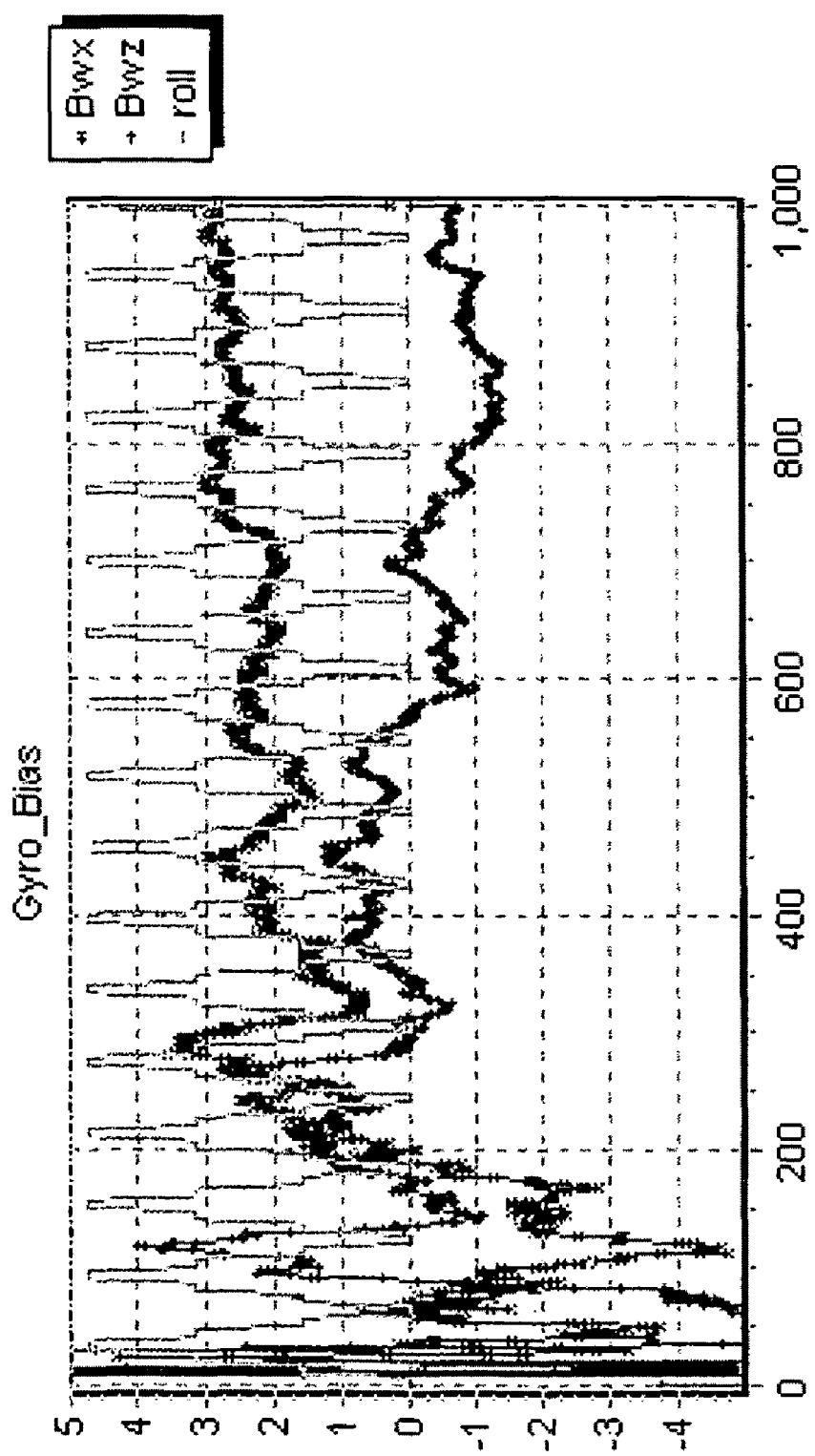
FIG. 23 illustrates a diagram of the optimal noise filtering (bias estimation) at the ~0.02 deg/√hr gyro noise.

The transient is delayed by more the 15 min due to the problem in gyro bias estimation. The best Kalman filter estimation at this level of the measurement noise is shown in FIG. 23.

2.7. Mortar Pointing Correction Mode

The major assumption in building the EPD for the dismounted mortar is that the mortar barrel does not move during the attitude determination process. There is a need to correct mortar barrel pointing from time to time. In a correction mode we can not continue azimuth and elevation determination unless additional information about the current mortar position with respect to the base is available. Such information can be derived, for example, from the angle measurements with encoders mounted on the mortar.

Using the high quality INS in the pointing correction mode we actually assume that the initial alignment is already done and dead reckoning allows maintaining current azimuth and elevation estimation within the orientation calculation accuracy, i.e. the inertial rate sensors measurement accuracy. The same approach we consider here for our self calibration EPD.

Two notes need to be made. First, using tactical grade inertial sensors we continuously perform the bias calibration during the azimuth/elevation determination process. Once we start pointing correction the bias estimation needs to be frozen in order to keep the initial bias estimation during the large disturbance in the rate measurements. Therefore, the duration of the mortar pointing correction shall not exceed the time which is limited by the bias instability, that is, ~1-2 min. Otherwise, the bias estimation accuracy degrades and it would take some time to recover after the correction mode. Second, with the minimal IMU configuration, we use and calibrate two rate sensors for the attitude determination in a stationary position. In a pointing correction mode we employ dead reckoning that requires three projections of the rate measured. The indexing error analysis (2.6.3.3.) gives a range of the desirable accuracy in a roll change during the pointing correction. Taking into account that the total roll change is a few degrees or less we probably can use the tactical grade sensor with ~1% errors for this component of the rate measurement in the dead reckoning (whereas the other two components of the rate are measured with the calibrated to high levels of accuracy rate sensors).

The above described approach allows us to keep accurate enough bias estimation and current attitude determination in the range of a few milli-radians during the mortar pointing correction (with a duration ~1-2 minutes). Returning to the stationary position the system recovers the original accuracy in less than half of the calibration cycle, that is, in ~20 sec.

Figure 24:
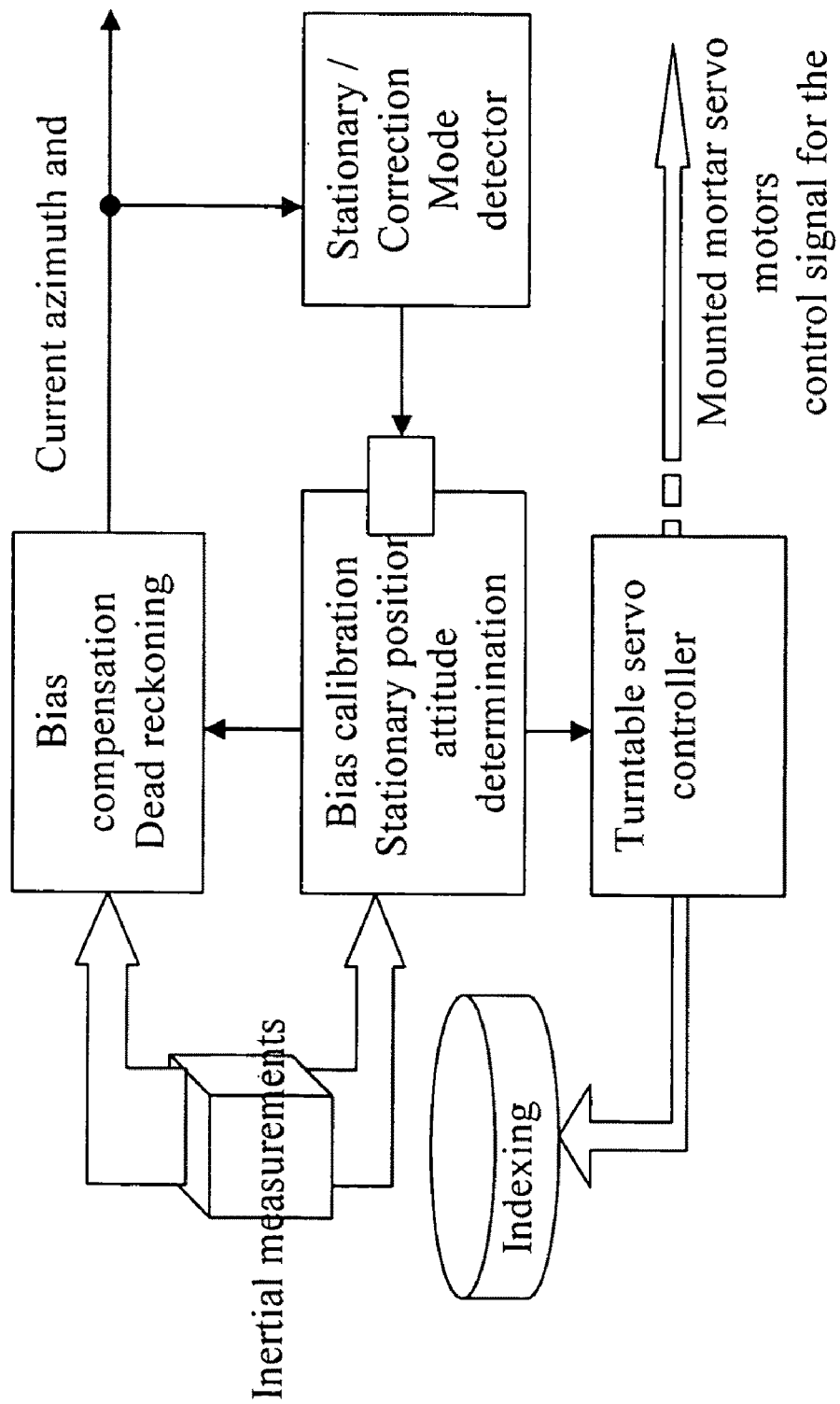
FIG. 24 is an algorithm diagram (pointing correction mode).

The implementation of the data processing, Kalman filtering requires more robust extended algorithm. The algorithm diagram is shown in the next FIG. 24.

3. System Implementation 3.1 EPD Prototype System Configuration

Figure 25:
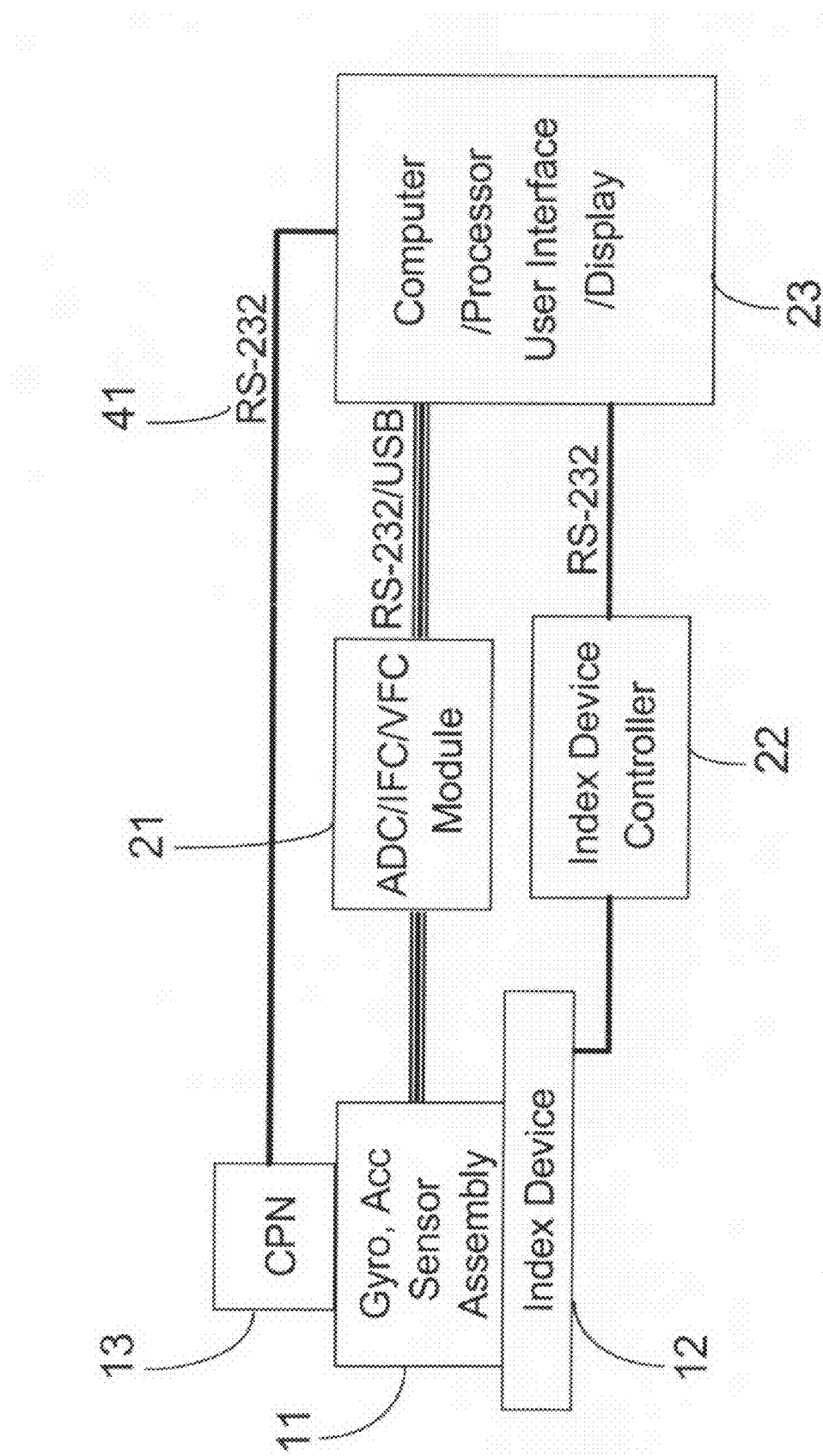
FIG. 25 is a block diagram of the EPD prototype system hardware configuration.

Based on the previous accomplishments of the past experience, we are able to devise an EPD prototype system configuration with both hardware and software components mostly decided. As shown in FIG. 25, the devised EPD prototype system consists of:
  A sensors/actuator assembly 10 including one 2-axis DTG gyro 13, two accelerometers 14, an indexing device 12 (rotary stage), and an AGNC CPN 11,
  The sensor interface circuits 20 to computer,
  A computation platform 30 with user interface/display.
  System Sensors/Actuator:
  One 2-axis DTG 13, with circuit module force re-balance, motor driver, and output signal interface, for sensing the earth rate and mortar angular motion.
  Two accelerometers 14, for sensing gravity.
  Indexing device 12 (Rotary stage), with controller unit, for real-time multiple position sensor calibration.
  AGNC CPN 11, for testing and motion detection aiding.
  Sensor Interface Circuits:
  2 channels, high accuracy ADC (or IFC, VFC) module, for two accelerometer measurement outputs.
  2 channels ADC module for two accelerometer temperature outputs.
  2 channels, high accuracy ADC (or IFC, VFC) module, for two DTG angular measurement outputs.
  1 or 2 channels ADC module for DTG temperature outputs.
  All the ADC (or IFC, VFC) modules will have standard interfaces to the computer/processor, such as RS-232 or USB.
  Computation Platform and User Interface/Display:
  During the prototype testing and evaluation stage, we use a PC/Windows for data processing and user interface/display.
  After the system evaluation, we will use an embedded processor/computer to obtain a small size data processing platform.
  The user interface/display is able to follow Army or other military standard.

Figure 26:
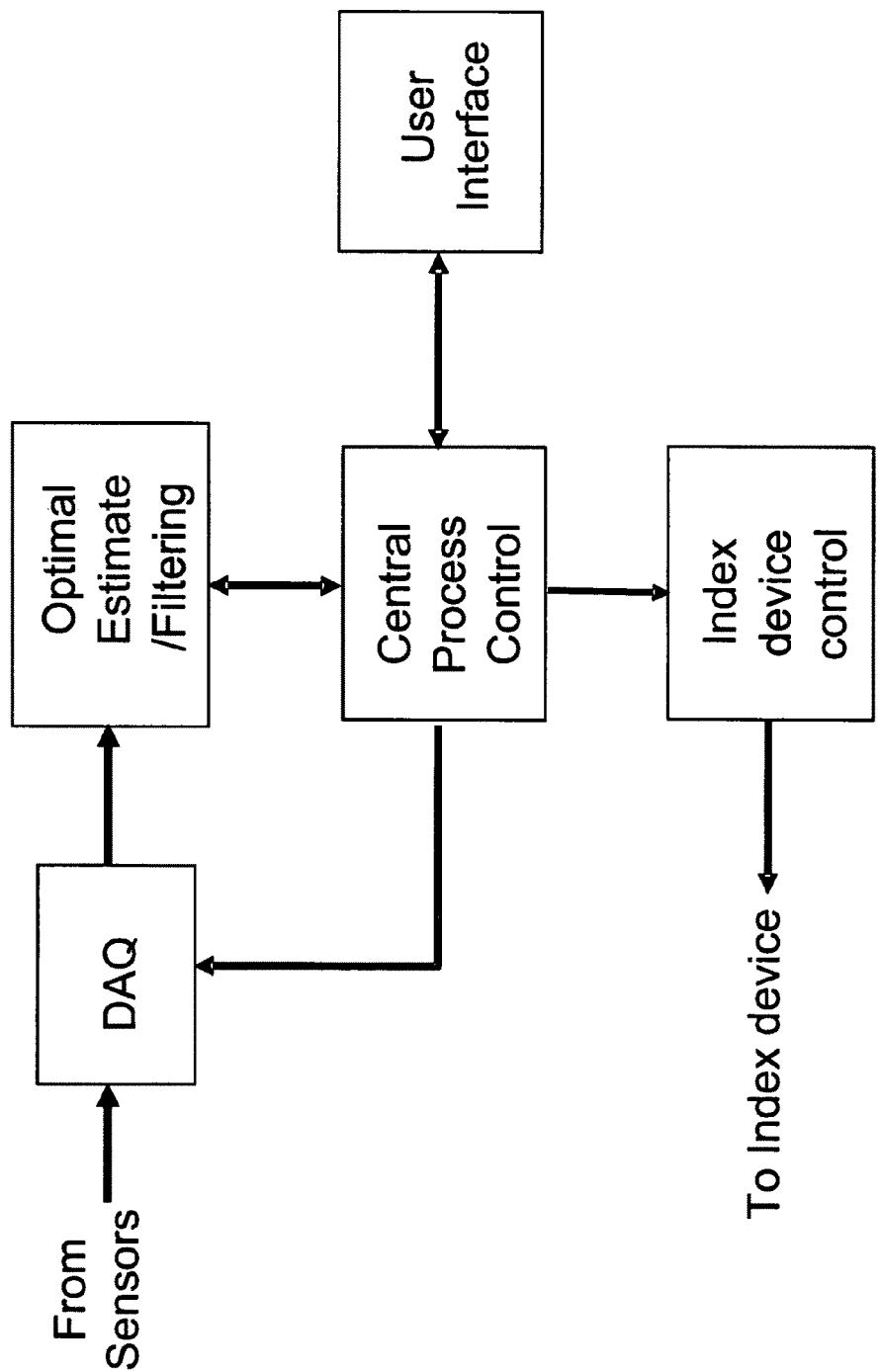
FIG. 26 is a block diagram of the EPD prototype system software configuration.

The following is a brief description of the anticipated major tasks for the EPD Prototype System:
  Hardware: Testing and evaluation of the 2-axis DTG gyro 13, with circuit module force re-balance, motor driver, and output signal interface.
  Hardware: Mounting assembly design and machining. Two accelerometers and the DTG gyro is mounted in this assembly with required alignment accuracy. The mounting assembly may comprises two mechanical pieces.
  Hardware: Selection, testing and evaluation of multiple channels (4+3) high accuracy ADC (or IFC, VFC) module for gyro and accelerometer measurements and temperature outputs. The ADC (or IFC, VFC) modules will have standard interfaces to the computer/processor, such as RS-232 or USB.
  Software: Gyro and accelerometer data acquisition program (API) design.
  Algorithm and Software: The gyro and accelerometer must be calibrated and compensated to reach the accuracy in the gyro and accelerometer specifications. This task provides design and programs of the test procedures for: misalignment calibration, temperature compensation, scale factor calibration. The bias of the sensor is calibrated in real-time by the EPD system calibration module.
  Software: Design an indexing device 12 control API to control the indexing device 12's motion by the EPD core process control program, instead of a separate vendor provided software. We can make use of the vendor provided document and programs.
  Algorithm and Software: The core EPD Algorithm and Program design. The Core EPD Program may consists of 3 major parts, as indicated in FIG. 26:
    A central process control program to synchronize the indexing device 12's rotation, DAQ, and the optimal filtering processing.
    Optimal estimation/filtering processing program.
    Interface programs/API, including GUI/display.
  Software: User interface/display program according to the requirements.
  Software: Communication with other fire control systems according to the requirements. At the test stage, we may make use of AGNC 4D GIS standard communication functions.

3.2 The Accelerometer and its Interface in the EPD

Major hardware components for the EPD prototype system include two accelerometers, indexing device 12 and its controller, and other test circuit modules. The characteristics and interface of the received accelerometers are described and discussed next.

The accelerometers include a current-output and internal temperature sensor. By applying temperature-compensating algorithms, bias, scale factor, and axis misalignment performance are dramatically improved. Implementation of the thermal modeling results in bias residual errors as low as ±200 µg and scale factor errors as low as ±400 ppm.

Features of the Accelerometer:

Excellent turn-on composite repeatability and stability performance

Environmentally rugged

Analog output

Field-adjustable range

Three fastener precision mounting flange

Internal temperature sensor for thermal compensation

Dual built-in test

Selectable bias temperature sensitivity

The accelerometer consists of an analog torque-balance sensor incorporating fused quartz flexures with support structure and permanent magnet torquer, a capacitive pick-off system, and self-contained servo electronics. The output signal is a current equal to the analog restoring current and proportional to acceleration. Enhanced performance is achieved through mathematical modeling of bias, scale factor, and axis misalignment over the operating temperature range. Modeling is referenced to the output current of a temperature sensor within the accelerometer. The hybrid electronics supplied with the is capable of at least ±125 mA output current to the torque motor circuit with input supply voltages set at ±15.0 VDC.

3.3 The Gyro DTG and its Interface

Figure 27:
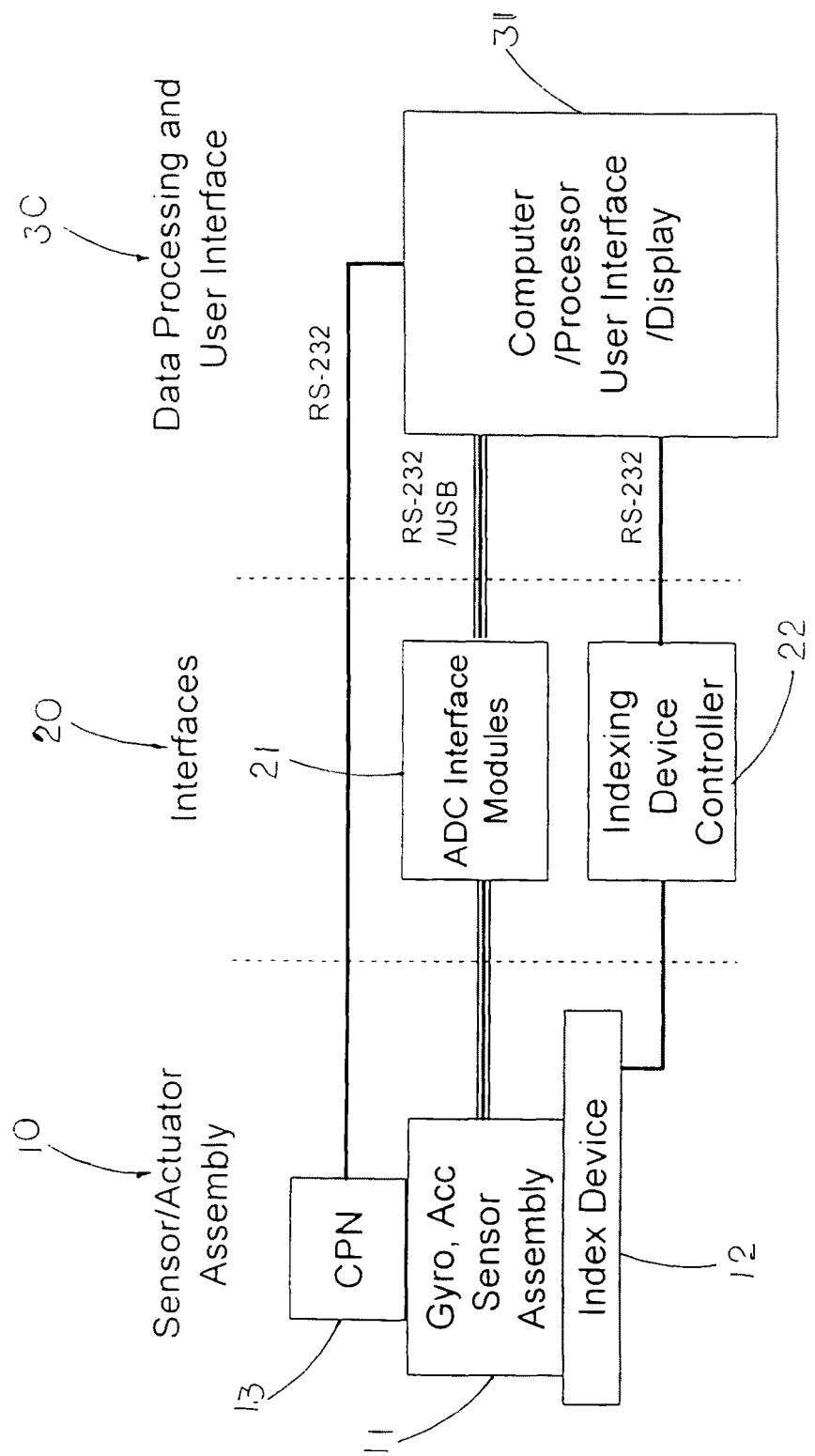
FIG. 27 is a block diagram of the EPD prototype system hardware configuration.

The objective of this invention is to implement, test, evaluate, and demonstrate a self-contained Miniaturized Smart Self-calibration Electronic Pointing Device (EPD) for dismounted/mounted mortar weapons. The EPD is based on small, lightweight, and relatively inexpensive inertial sensors, with an indexing device 12 and an AGNC Coremicro® Palm Navigator (CPN) for calibration and test aiding. Our targeted EPD features small size, light weight, portability, and low cost, with satisfactory performance for small mortar weapons and other fire control applications. We have devised an EPD prototype system configuration, with most of its hardware using the COTS components. As shown in FIG. 27, the devised EPD prototype system hardware consists of:

A sensors/actuator assembly 10 including one 2-axis DTG gyro 13, two accelerometers 14, an indexing device 12 (rotary stage), and an AGNC CPN 11.

The sensors/actuator interface modules to the computer.

A computation platform 30 with user interface/display.

The dynamically tuned gyro (DTG) is a miniature, two-degree-of-freedom gyroscope developed to meet a wide variety of applications for guidance, control, and stabilization. The inherent mechanical stability of the gyro's one-piece suspension provides two axes of highly reliable, low-drift information capable of performing over a wide environmental range. Repeatable performance is assured over the temperature range, allowing easy modeling and eliminating the need for heaters in most applications.

The DTG is used as a position sensor when mounted on a platform in a gimbaled system, or as a rate sensor in the strapdown mode. In our EPD system, the DTG gyro is working in the strapdown mode to output 2 DOF of angular rates. The whole DTG subsystem is composed of an inertial rate sensor (gyro) and support electronics. The inertial rate sensor is a dynamically tuned gyro. The support electronics design features a power supply board and associated instrument caging electronics. Industrial grade components are used in the support electronics design. The gyro provides measurements of the inertial rates of the platform in two orthogonal axes. Outputs from the gyro are analog voltages proportional to rate and BIT status.

3.4 EPD Sensor ADC Interfaces to the Computer

Figure 28:
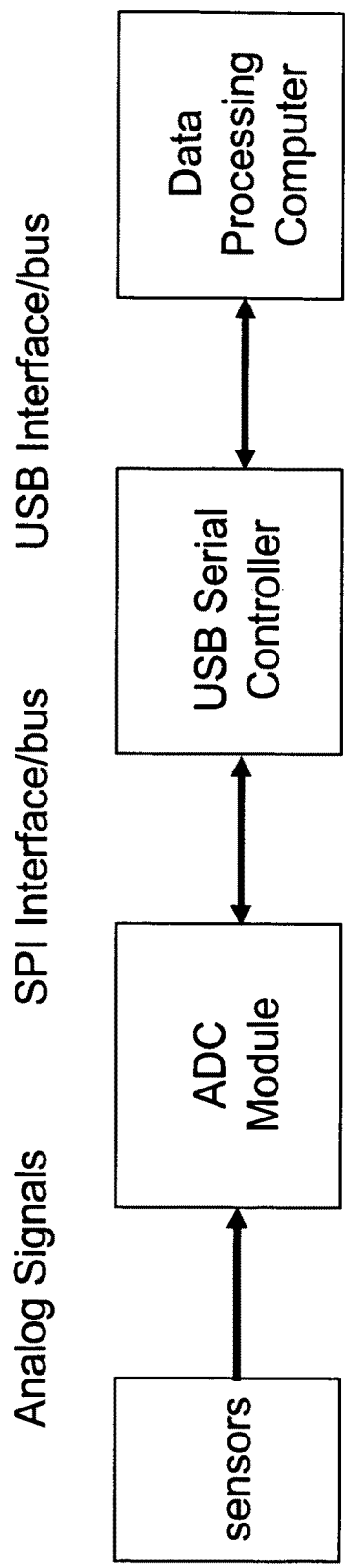
FIG. 28 is a block diagram of the ADC interface circuit modules.

In our EPD system, the outputs of the DTG gyro and the accelerometers are all analog signals. Therefore, we have developed a suite of ADC circuit modules to interface the inertial sensors to the data processing computer. The developed ADC interface modules have been tested with a PC Windows system which is the data processing platform for the EPD prototype, as depicted in FIG. 28. After the ADC interface is verified, we are currently developing a suite of ADC interface drivers and API program, which is used by the EPD software to communicate with the ADC interface modules and acquire data from the DTG gyro and the accelerometers. In this chapter, the characteristics of the developed ADC interface modules, their circuit configurations, and testing approaches are described and discussed.

We use a prototype ADC, which contains an 8/16 channel, 24-bit ΔΣ ADC IC chip. ADC is a demonstration boards. It is designed to allow easy evaluation of the ADC and can be connected directly to the target application's analog signals while using the USB Serial Controller. The USB Serial Controller board and supplied software to measure performance. The exposed ground planes allow proper grounding to prototype circuitry. After evaluating with software, the digital signals can be connected to the application's processor/controller for development of the serial interface.

3.5 EPD Sensor ADC Module Configuration and Interface

The inertial sensor assembly of the EPD consists of one 2-axis (2-channel) DTG gyro and two single axis accelerometers. The 2-axis DTG, with circuit module force re-balance, motor driver, and output signal interface, is used for sensing the earth rate and mortar angular motion. The two accelerometers are used for sensing gravity. The outputs of the gyro and accelerometers are analog currents or voltages. In the EDP circuit interface design, all the outputs are converted to analog voltages and are digitized by an 8/16-channel ADC module. The ADC channel assignment of the sensor signal is described in the following table.

TABLE 2-1

ADC Channel Assignment

| Channel Number | Sensor Signal | Remark |
|---|---|---|
| 1. | Accelerometer X Acc | |
| 2. | Accelerometer X Temperature | For temperature compensation |
| 3. | Accelerometer Y Acc | |
| 4. | Accelerometer Y Temperature | For temperature compensation |
| 5. | Gyro X Angular rate | |
| 6. | Gyro Y Angular rate | |
| 7. | Gyro BIT voltage level | For gyro fault detection |
| 8. | TBD | |

Figure 29:
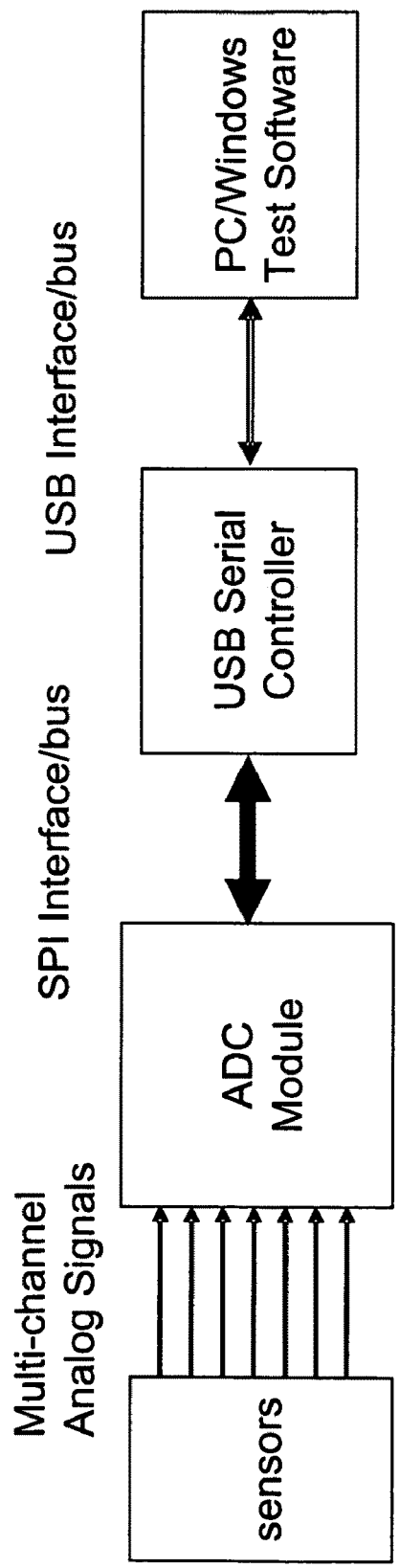
FIG. 29 is a block diagram of the ADC interface configuration—connect to USB of a PC.

During this reporting period, the developed ADC module and the sensors were further tested with a PC Windows system to verify the ADC resolution and the sensors stability. For the testing and prototyping with the PC Windows system, a USB serial controller was used to interface the ADC module with the PC for acquiring data from the DTG gyro and the accelerometers, as depicted in FIG. 29.

Figure 30:
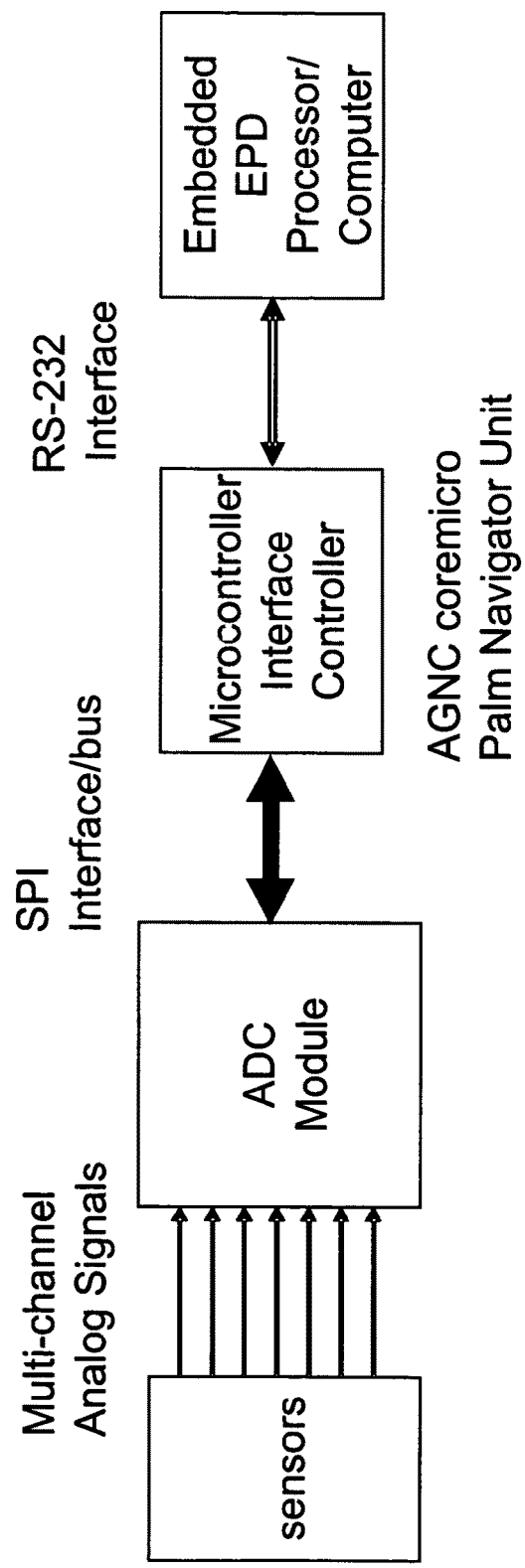
FIG. 30 is a block diagram of the ADC interface configuration—connect to RS_232 of an embedded computer.

For the embedded system implementation, we are going to use a dedicated microcontroller to interface the ADC module with EPD data processing computer, as depicted in FIG. 30. A suite of ADC interface drivers and API program are developed, for PC and the interfacing microcontroller, respectively.

3.6 The EPD Sensor Compensation Design and Implementation

In order to achieve high accuracy, the EPD inertial sensors, the DTG gyro and accelerometer must be compensated for their deterministic errors. For EPD sensor data processing, according to the sensor testing data, we have designed a suite of algorithms and programs for sensor error compensation and calibration, which are necessary for EPD implementation in order to achieve high pointing accuracy. In the EPD system, the inertial sensors deterministic errors compensation includes:

gyro bias temperature compensation.
gyro scale factor temperature compensation.
gyro misalignment compensation.
gyro g-sensitivity compensation.
accelerometer bias temperature compensation.
accelerometer scale factor temperature compensation.

For the accelerometer, we have received the lab test data sheet for the bias and scale factor temperature compensation, with the delivery of the devices. The following is a brief description of the accelerometer temperature compensation method and algorithms. A suite of programs have been developed for the test of the compensation method and algorithms.

3.6.1 Accelerometer Temperature Compensation

The accelerometer output signal is a current equal to the analog restoring current and proportional to acceleration. Enhanced performance is achieved through mathematical modeling of bias and scale factor over the operating temperature range. Modeling is referenced to the output current of a temperature sensor within the accelerometer.

Nominal values of the scale factor and bias apply at 24±5° C. The scale factor and bias calibration data provided are referenced to local gravity. To achieve accuracy over temperature, accelerometer performance parameters are thermally modeled. Both scale factor and bias are modeled over the operating temperature range. Fourth-order polynomial temperature models for bias and scale factor are provided. Use of the models to process output data has the effect of canceling temperature sensitivity which greatly enhances performance within the operating temperature range.

The temperature model used is as follows:
1. Temperature a. Measure the temperature sensor current to the nearest 0.1 microampere (0.1° C.). b. Subtract 293.0 microamperes to normalize the temperature to approximately 20° C. Assign variable name A.
2. Scale factor and bias a.
Calculate temperature corrected scale factor in mA/g.

$$SF = C0 + C1(A) + C2(A^2) + C3(A^3) + C4(A^4)b.$$

Calculate temperature corrected bias in µg.

$$Bias = B0 + B1(A) + B2(A^2) + B3(A^3) + B4(A^4)$$

The C0 and B0 terms are constants, found among the modeling information supplied with the accelerometer. The other B and C terms are the higher-order terms (coefficients), also in the modeling information.

Acceleration Calculation
1) Measure accelerometer output current (I) in mAmp.
2) Calculate acceleration, in g's.
$g = I/SF - [(Bias)(10^{-6})]$
where:
SF temperature corrected scale factor (mA/g) calculated in 2a.
Bias temperature corrected bias (µg) calculated in 2b.
g indicated acceleration in g's, where 1 g=9.8071 meter/sec$^2$.

3.7 DTG Sensor Error Compensation and Calibration Algorithms

In order to achieve high accuracy, the EPD inertial sensors, the DTG gyro and accelerometers must be compensated for their deterministic errors. In the EPD system, the inertial sensors deterministic errors compensation includes:

DTG gyro bias temperature compensation.
DTG gyro scale factor temperature compensation.
DTG gyro misalignment compensation.
DTG gyro g-sensitivity compensation.
accelerometer bias temperature compensation.
accelerometer scale factor temperature compensation.

For EPD sensor data processing, according to the sensor test data, we have designed a suite of algorithms and programs for sensor error compensation and calibration, which are necessary for EPD implementation in order to achieve high pointing accuracy. Error compensation algorithms for the accelerometers are also utilized. Next we present a description of the DTG sensor error compensation and calibration algorithms.

The major sensor errors for the DTG gyro include:
1. Random drift or bias.
2. Constant bias.
3. Temperature dependent bias/drift.
4. g-sensitive (acceleration dependent) bias/drift.
5. Temperature dependent scale factor error.
6. Sensor axis misalignment errors.

Except for the first error item, the other items are all deterministic errors, which means that they can be estimated and compensated through a systematic approach. In fact for the DTG gyro, these deterministic errors can be quite large and must be compensated in a practical application, in order to achieve high system accuracy.

3.7.1 DTG Temperature Dependent Bias/Drift

According to the DTG gyro specification, we choose the bias thermal stability is 0.1 degree/hr/° C. This means if the temperature changes 10 degrees, it could induce a rate drift of 1 degree/hr. Considering the nominal gyro accuracy of 0.05 degree/hr, this temperature induced gyro drift must be compensated.

In contrast to the accelerometers, the DTG gyro we selected for the EPD does not have an embedded temperature sensor, and the manufacturer does not provide the temperature model parameters. Therefore, we use an external temperature sensor (with other sensors) for DTG gyro temperature measurement and establish a temperature model for each gyro through a lab test procedure A three-order polynomial temperature model for gyro bias is used.

$$B_{gyro} = B_0 + B_1(T - T_0) + B_2(T - T_0)^2 + B_3(T - T_0)^3$$

where
$B_{gyro}$ is temperature dependent gyro drift;
T is the temperature read in ° C.;
$T_0$ is the nominal temperature, usually defined as 20° C.;
$B_0$ is the constant bias, or the drift at nominal temperature, 20° C.;
$B_1$ to $B_3$ are temperature coefficients.

The parameters $B_0$ to $B_3$ are determined by a lab test procedure. The gyro drift must be measured at 4 different temperature points in order to determine the parameters $B_0$ to $B_3$. Usually 8 to 10 temperature points are used and a least-squares optimal estimation method is used for parameter calculation by solving the following equations:

$$B_{gyro}1 = B_0 + B_1(T1 - T_0) + B_2(T1 - T_0)^2 + B_3(T1 - T_0)^3$$

$$B_{gyro}2 = B_0 + B_1(T2 - T_0) + B_2(T2 - T_0)^2 + B_3(T2 - T_0)^3$$

$$B_{gyro}n = B_0 + B_1(Tn - T_0) + B_2(Tn - T_0)^2 + B_3(Tn - T_0)^3$$

As long as the temperature model for gyro bias is established, it can be used to compensate the temperature induced gyro drift.

3.7.2 Sensor Axis Misalignment Calibration and Compensation

The EPD is based on the inertial vector measurement of the angular velocity and linear acceleration, with respect to the EPD assembly case coordinate system. Ideally the sensor input axis must be coincident with the respective EPD assembly case axis. If the two respective axes are not coincident, an error is induced, called misalignment error. The misalignment error can also be caused by imprecision in the installation of the sensor into the EPD assembly. For the DTG gyro used in the EPD, the axis misalignment can be as big as 0.2 deg, so it must be compensated for each sensor axis.

In navigation systems, the definition of the coordinate system is essential for system design and implementation, since most of the system measurements and computations are performed with respect to a series of coordinate systems. The body coordinate system is an orthogonal, right-handed, Cartesian frame with 3 coordinate axes, X, Y, and Z. After the body frame is defined, the sensor measurements are performed with respect to their corresponding axes. For example, the body angular velocity is measured by 3 gyros in three axes, denoted as:

$$\vec{\omega}_{ib}^{b} = \begin{bmatrix} \omega_x \\ \omega_y \\ \omega_z \end{bmatrix}$$

If it is assumed that the sensors' sensitive axes are identical to the respective body frame axes, the angular velocity components can be taken directly from the outputs of the 3 sensors:

$$\vec{\omega}_{ib}^{b} = \begin{bmatrix} \omega_x \\ \omega_y \\ \omega_z \end{bmatrix} = \begin{bmatrix} \omega_{xout} \\ \omega_{yout} \\ \omega_{zout} \end{bmatrix}$$

In a practical system, however, the actual sensitive axes of the sensors are not always identical to the respective body frame axes, because of errors in fabrication, assembly, or installation. This error in the sensor axis placement in a practical system is called sensor misalignment. To achieve high accuracy in the navigation system, the sensor misalignment must be determined by a calibration procedure and be compensated in the system processing.

In the EPD Unit, the sensor misalignment for gyros and accelerometers is addressed. After a unit is assembled, the sensor misalignments with respect to the unit body frame are fixed. The following two procedures are performed on every unit:

Sensor calibration to determine the actual angular position of every sensor axis in the unit body frame.

Compensation procedure in the system processing to eliminate the error caused by the sensor misalignments.

Figure 31:
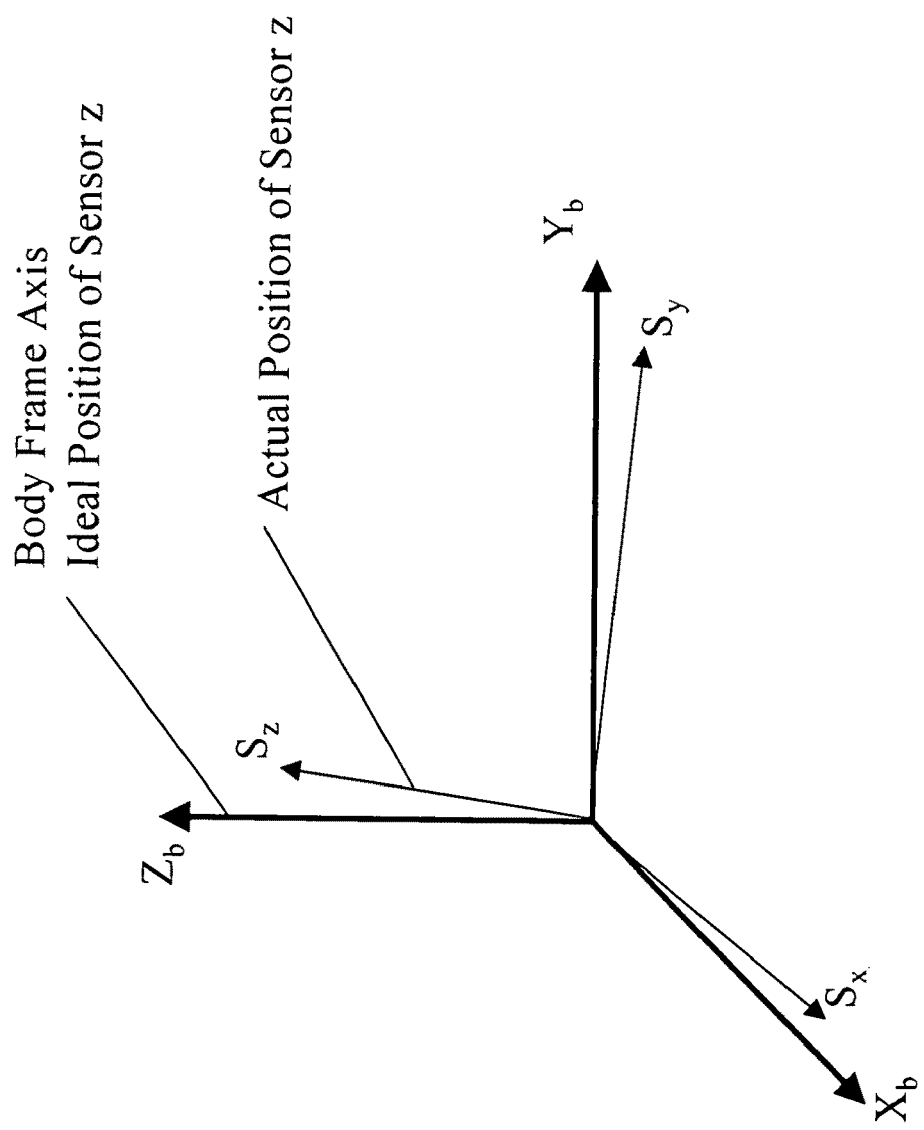
FIG. 31 illustrates the sensor axis position in unit body frame.

The actual angular position of a sensor axis in the unit body frame can be represented by a unit vector in the body frame, denoted by Sx, Sy, Sz, as shown in FIG. 31.

The angular position of a unit vector, or a sensor axis, is expressed as $$S = \begin{bmatrix} \cos\theta_x \\ \cos\theta_y \\ \cos\theta_z \end{bmatrix}$$

where $\theta_x$ is angle between the vector and $X_b$ axis; $\theta_y$ is angle between the vector and $Y_b$ axis; $\theta_z$ is angle between the vector and $Z_b$ axis. And the 3 angles are related by the equation:

$$\cos^2\theta_x + \cos^2\theta_y + \cos^2\theta_z = 1$$

For the sensors (gyros or accelerometers) in the EPD unit, their position in the unit body frame is represented by:

$$S_x = \begin{bmatrix} \cos\alpha_x \\ \cos\alpha_y \\ \cos\alpha_z \end{bmatrix}$$

$$S_y = \begin{bmatrix} \cos\beta_x \\ \cos\beta_y \\ \cos\beta_z \end{bmatrix}$$

$$S_y = \begin{bmatrix} \cos\gamma_x \\ \cos\gamma_y \\ \cos\gamma_z \end{bmatrix}$$

If there is no sensor axis misalignment, $S_x$ is identical with $X_b$, $S_y$ is identical with $Y_b$, and $S_z$ is identical with $Z_b$. The sensor representative vectors become:

$$S_x = \begin{bmatrix} 1 \\ 0 \\ 0 \end{bmatrix}$$

$$S_y = \begin{bmatrix} 0 \\ 1 \\ 0 \end{bmatrix}$$

$$S_y = \begin{bmatrix} 0 \\ 0 \\ 1 \end{bmatrix}$$

The objective of the misalignment calibration is to determine the components of the unit vectors:

$\cos\alpha_x$, $\cos\alpha_y$, $\cos\alpha_z$, $\cos\beta_x$, $\cos\beta_y$, $\cos\beta_z$, $\cos\gamma_x$, $\cos\gamma_y$, $\cos\gamma_z$ or the corresponding angles. In the system processing, the components of the unit vectors are useful and AGNC's misalignment calibration methods can directly compute them. After the components are determined, the sensor axis misalignment induced angular error can be expressed as:

Sensor X's axis misalignment: $\alpha_x, \alpha_y-90, \alpha_z-90$
Sensor Y's axis misalignment: $\beta_x-90, \beta_y, \beta_z-90$
Sensor Z's axis misalignment: $\gamma_x-90, \gamma_y-90, \gamma_z$ AGNC has developed a suite of sensor misalignment calibration methods for its navigator products. For the EPD system used for attitude (elevation) and heading (azimuth) determination, the calibration method is briefly described in this section as follows.

After the unit is assembled, every sensor's axis position in the unit body frame is fixed and will not change until the sensors are reassembled later for repair or maintenance. The objective of the misalignment calibration is to determine the sensors' axes position in the unit body frame, which are represented by a set of unit vectors, as discussed in the last section.

The principle of the misalignment calibration is to excite the sensors at multiple known angular positions and process the data acquired. The process is:

Install the unit precisely aligned on a test block.

Install the block on the test platform. At multiple angular positions input the exciting physical vectors and collect data.

Process the data to obtain the components of the unit vectors that represent the sensors' axes angular positions.

For the gyro calibration using a 6 position method, the input exciting physical vector is a constant angular rate applied by the rate table and the block is put on the rate table at 6 positions, determined by the 6 surfaces of the orthogonal block. The input angular rates/velocities at the 6 positions expressed in the unit body frame, are as follows:

$$\vec{\omega}_{in} = \begin{bmatrix} \omega_{in} \\ 0 \\ 0 \end{bmatrix}$$

$$\vec{\omega}_{in} = \begin{bmatrix} 0 \\ \omega_{in} \\ 0 \end{bmatrix}$$

$$\vec{\omega}_{in} = \begin{bmatrix} 0 \\ 0 \\ \omega_{in} \end{bmatrix}$$

$$\vec{\omega}_{in} = \begin{bmatrix} -\omega_{in} \\ 0 \\ 0 \end{bmatrix}$$

$$\vec{\omega}_{in} = \begin{bmatrix} 0 \\ -\omega_{in} \\ 0 \end{bmatrix}$$

$$\vec{\omega}_{in} = \begin{bmatrix} 0 \\ 0 \\ -\omega_{in} \end{bmatrix}$$

Similarly, for the accelerometer calibration using a 6 position method, the input exciting physical vector is the earth's gravity and the block is put on a precisely leveled platform at 6 positions, determined by the 6 surfaces of the orthogonal block. The input specific force (gravity), at the 6 positions expressed in the unit body frame, is as follows:

$$\vec{f}_{in} = \begin{bmatrix} f_{in} \\ 0 \\ 0 \end{bmatrix}$$

$$\vec{f}_{in} = \begin{bmatrix} 0 \\ f_{in} \\ 0 \end{bmatrix}$$

$$\vec{f}_{in} = \begin{bmatrix} 0 \\ 0 \\ f_{in} \end{bmatrix}$$

$$\vec{f}_{in} = \begin{bmatrix} -f_{in} \\ 0 \\ 0 \end{bmatrix}$$

$$\vec{f}_{in} = \begin{bmatrix} 0 \\ -f_{in} \\ 0 \end{bmatrix}$$

$$\vec{f}_{in} = \begin{bmatrix} 0 \\ 0 \\ -f_{in} \end{bmatrix}$$

The data collected at multiple positions are then processed by the AGNC's sensor calibration software and for every sensor (gyro, accelerometer or magnetometer) we obtain its axes position, expressed by a unit vector, as:

$$S = \begin{bmatrix} \cos\theta_x \\ \cos\theta_y \\ \cos\theta_z \end{bmatrix}$$

Based on the axes positions, for a sensor triad (3 gyros, or 3 accelerometers) a matrix is obtained in the system processing for the misalignment compensation. This matrix transforms the sensor outputs, which are measured by the sensors at their misaligned position, to the equivalent sensor measurements in the body frame that can be used correctly by the user.

For gyro misalignment compensation:

$$\omega^b = \begin{bmatrix} \omega_x^b \\ \omega_y^b \\ \omega_z^b \end{bmatrix} = M_{3\times3}^{gyro} \begin{bmatrix} \omega_x^o \\ \omega_y^o \\ \omega_z^o \end{bmatrix} = M_{3\times3}^{gyro} \omega^o$$

where $M_{3\times3}^{gyro}$ is the gyro axis misalignment compensation matrix; $\omega^o$ is the vector of 3 sensors outputs; $\omega^b$ is the calibrated gyro output expressed in the unit body frame.

For accelerometer misalignment compensation:

$$f^b = \begin{bmatrix} f_x^b \\ f_y^b \\ f_z^b \end{bmatrix} = M_{3\times3}^{acc} \begin{bmatrix} f_x^o \\ f_y^o \\ f_z^o \end{bmatrix} = M_{3\times3}^{acc} f^o$$

where $M_{3\times3}^{acc}$ is the accelerometer axis misalignment compensation matrix; f$^o$ is the vector of 3 sensors outputs; f$^b$ is the calibrated accelerometer output expressed in the unit body frame.

3.8. EPD Sensor Interface Design and Implementation

We performed the EPD sensor interface controller design and implementation using the AGNC CPN processing platform. The sensor assembly of the EPD consists of one 2-axis (2-channel) DTG gyro and two single axis accelerometers. All sensor output signals are analog voltages and are digitized by an ADC module. The sensor output signals characteristics and the ADC channel assignment are described in the following table.

TABLE 2-1

Sensor Output Signals and ADC Channel Assignment

| Sensor Signal | V/I | SF | Max Range | Measure Range |
|---|---|---|---|---|
| X Acc | Current | 1.3 mA/g | ±78 mA | ±60 g |
| X Acc Temperature | Current | 1.0 μA/° C. | (20° C. 290 to 298 μA) | (10K load) |

TABLE 2-1-continued

Sensor Output Signals and ADC Channel Assignment

| Sensor Signal | V/I | SF | Max Range | Measure Range |
|---|---|---|---|---|
| Y Acc | Current | 1.3 mA/g | ±78 mA | ±60 g |
| Y Acc Temperature | Current | 1.0 µA/° C. | (20° C. 290 to 298 µA) | (10KΩ load) |
| Gyro X | Voltage | 50 V/rad/sec | ±10 V | ±11°/sec |
| Gyro Y | Voltage | 50 V/rad/sec | ±10 V | ±11°/sec |
| Gyro BIT | Voltage | (can input from a discrete logic port) | 0.8 to 2.8/5.2 | Fail to Pass |
| Gyro Temperature (optional) | Voltage | 8.4 mV/° K | (298° K at 2.5 V) | (max current load 50 µA) |

During most of the EPD operation, the accelerometers will sense the gravity, thus their outputs are within ±1.3 mA. Using a resistor of 3.3 KΩ, we get a voltage of ±4.29V for the ADC converter.

The accelerometer temperature current output can also be transformed to a voltage by a 10KΩ resistor load.

$$\text{Voltage} = R * I = R * (298(\mu A) + 1.0(\mu A /° C.) * T(° C.)) = 2.98 + 0.01 * T$$

The scale factor of the gyro is about 0.877 v/°/sec. To accurately measure the angular rate of 0.01°/hr, we need an ADC with a resolution about 22 bit. The earth rate of 15°/hr is measured at about 0.00365 V=3.65 mV=3650 µV. Thus the accuracy of the ADC should be better than 3.65 µV. In our ADC circuit, special programmable gain amplifier and ADC calibration processing are used to maintain the required accuracy.

Figure 32:
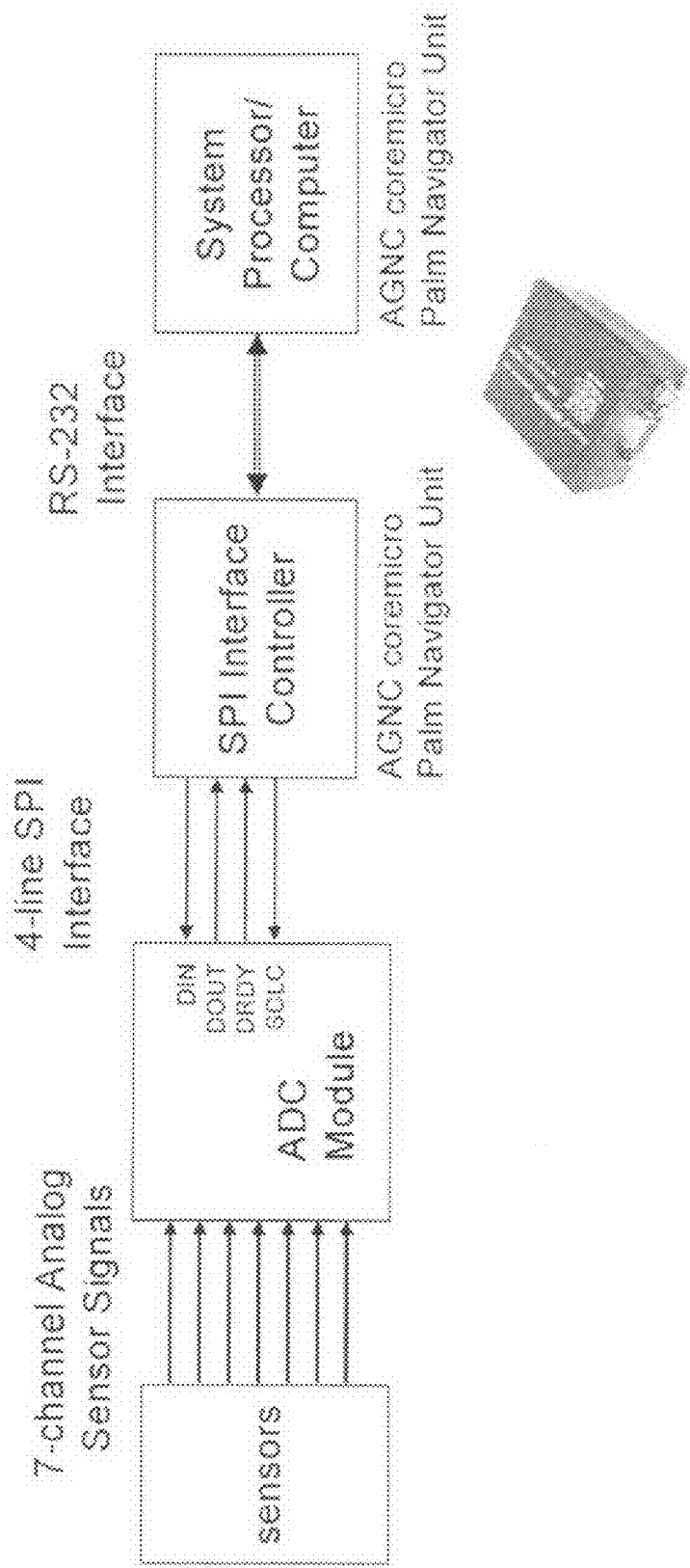
FIG. 32 is a block diagram of the EPD ADC interface implementation.
Figure 33:
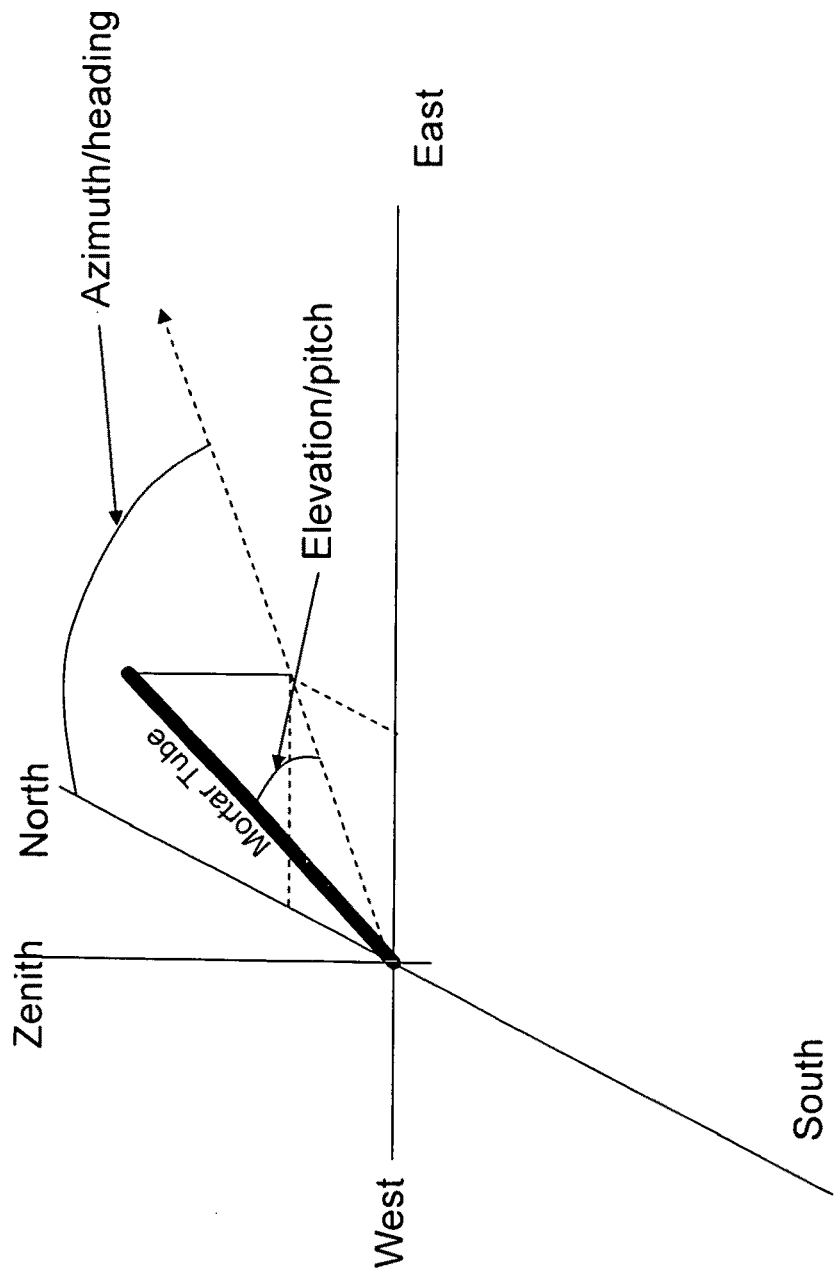
FIG. 33 illustrates the mortar elevation and azimuth definition.

The user interface of the ADC module is an SPI serial port. To operate the ADC module, a special SPI interface is implemented by the CPN to control the operation of the ADC module. The acquired sensor data are then transmitted to the system processor (implemented by the CPN processors) via a high speed RS-232 port as depicted in FIG. 32. The ADC software design includes the AGNC's CPN program for ADC process control through the SPI bus and CPN based API for ADC data acquisition and basic sensor calibration and compensation processing 3.9. EPD Sensor Assembly and Coordinate System Definition The mechanical design and machining of the EPD sensor assembly are finished and the EPD sensors and circuits are assembled together for test and evaluation. The EPD sensor assembly is tested on a 2-axis platform for further verification of the sensor accuracy and the installation accuracy of the sensors in the assembly. Then the sensor assembly is mounted on the indexing device 12 for the inertial sensor calibration tests. Two configurations for mounting of the sensor assembly on the indexing device 12 are tested, evaluated and compared for their performance and suitability in our EPD application. A brief description of the EPD sensor assembly is presented. The two configurations for mounting of the sensor assembly and its coordinate system definitions are discussed.

The EPD sensor assembly consists of one 2-axis (2-channel) DTG gyro, two single axis accelerometers, an ADC board and an AGNC CPN for ADC control and basic sensor data processing.

The EPD is mounted on the mortar to determine the mortar's elevation/pitch and azimuth/heading through the measurements of the earth rate, gravity and the mortar's angular motion. We define a mortar body coordinate system (body frame) which is fixed on the mortar body and with the X axis aligned with the mortar tube. Then the mortar elevation/pitch is defined as the angle between the X axis and the level plane. The azimuth/heading is defined as the angle between the true north and the X axis's projection on the level plane. The roll angle that is related to the mortar body's angular position does not affect the mortar tube's pointing direction.

In practice, for simplicity, we define the EPD sensor assembly's coordinate system (sensor frame) to be coincident with mortar body frame (B frame). Thus the EPD B frame angular position and the mortar angular position have the following relationship:

EPD frame pitch=mortar elevation;

EPD frame heading=mortar azimuth;

The roll angle of the EPD is not required for mortar pointing, but we need to resolve it inside the EPD processing for mortar/EPD attitude determination.

In the EPD system we use three different but equivalent methods for the mortar attitude representation:

Euler angles, that is, pitch, heading, and roll;

a Direction cosine matrix (DCM); Quaternion.

The Euler angles are a very intuitive method and they are required for output, but they are not used for internal processing because they involve too many trigonometric function calculations. The Euler angle representation has a singular point at pitch=±90 degrees, where the heading and roll become indeterminate. Therefore, in the EPD system processing, we use quaternion and DCM for internal processing, and only for the output the quaternion and DCM representations are transformed to Euler angle representation.

Figure 34:
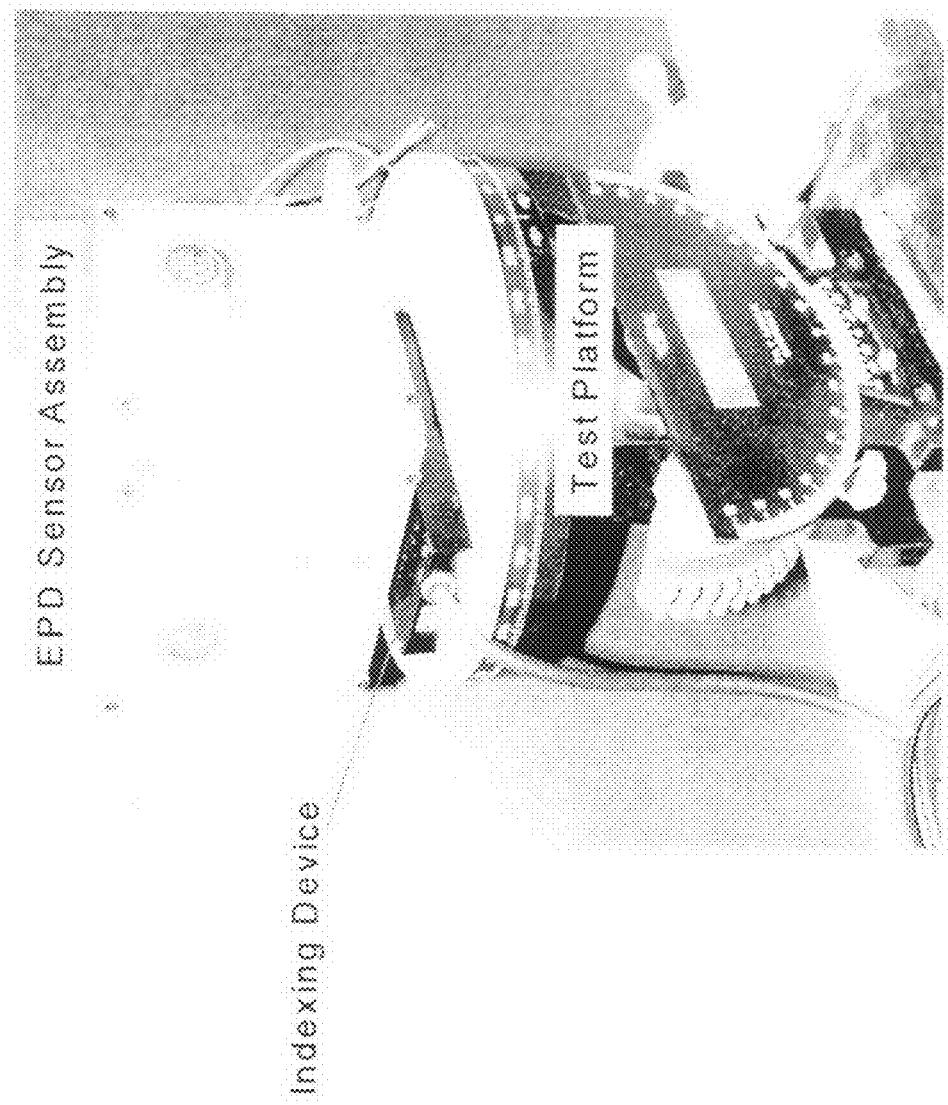
FIG. 34 is a perspective view of the EPD sensor assembly test with the indexing device.

In the EPD system, in order to facilitate the inertial sensor calibration and enhance the system accuracy, an indexing device 12 is used to move the EPD sensor assembly in different positions when the system is starting or during the system operation. FIG. 34 shows the EPD sensor assembly mounted on the indexing device 12 for testing.

Figure 35:
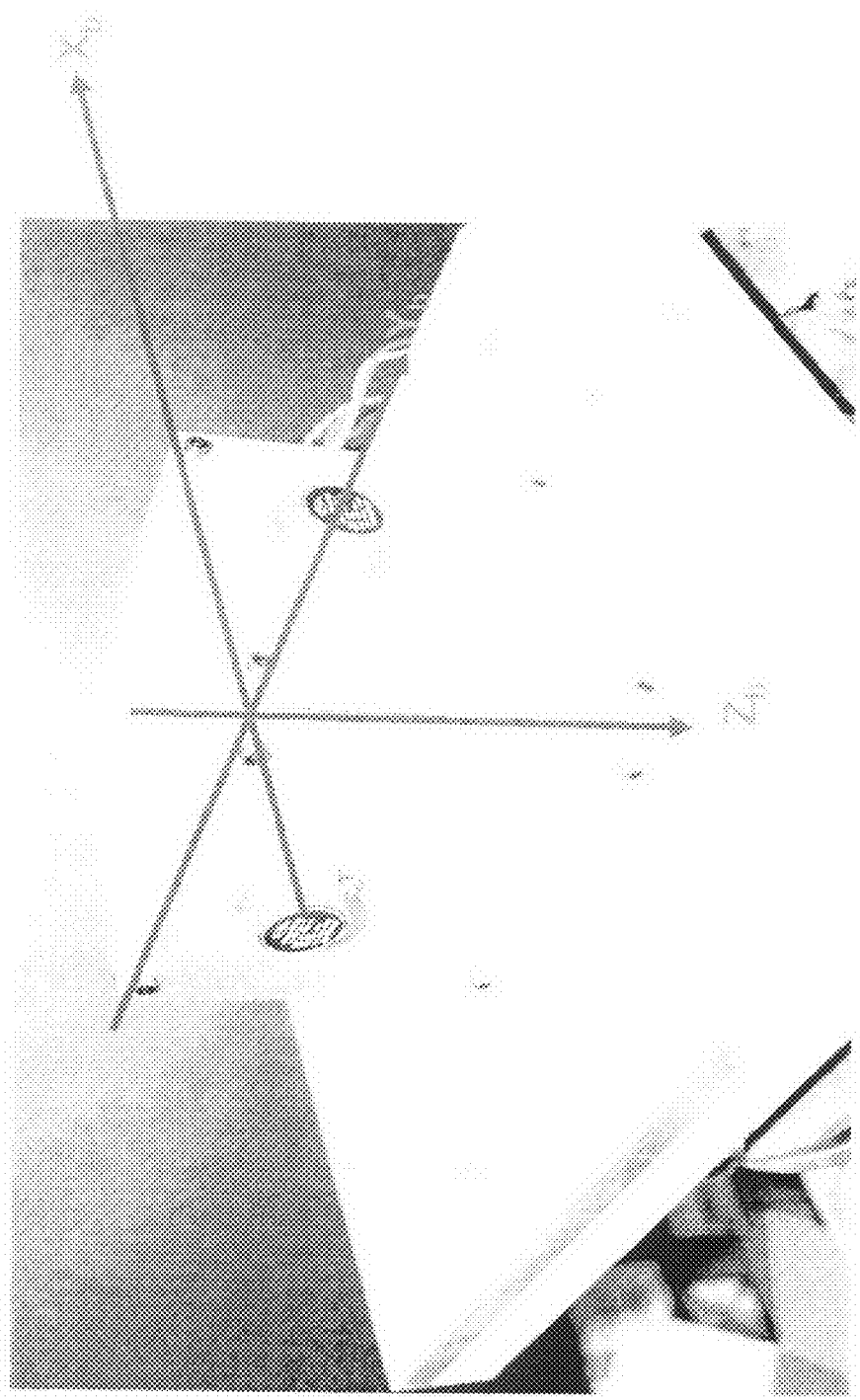
FIG. 35 is a perspective view of the EPD body frame definition for mounting configuration 1.
Figure 36:
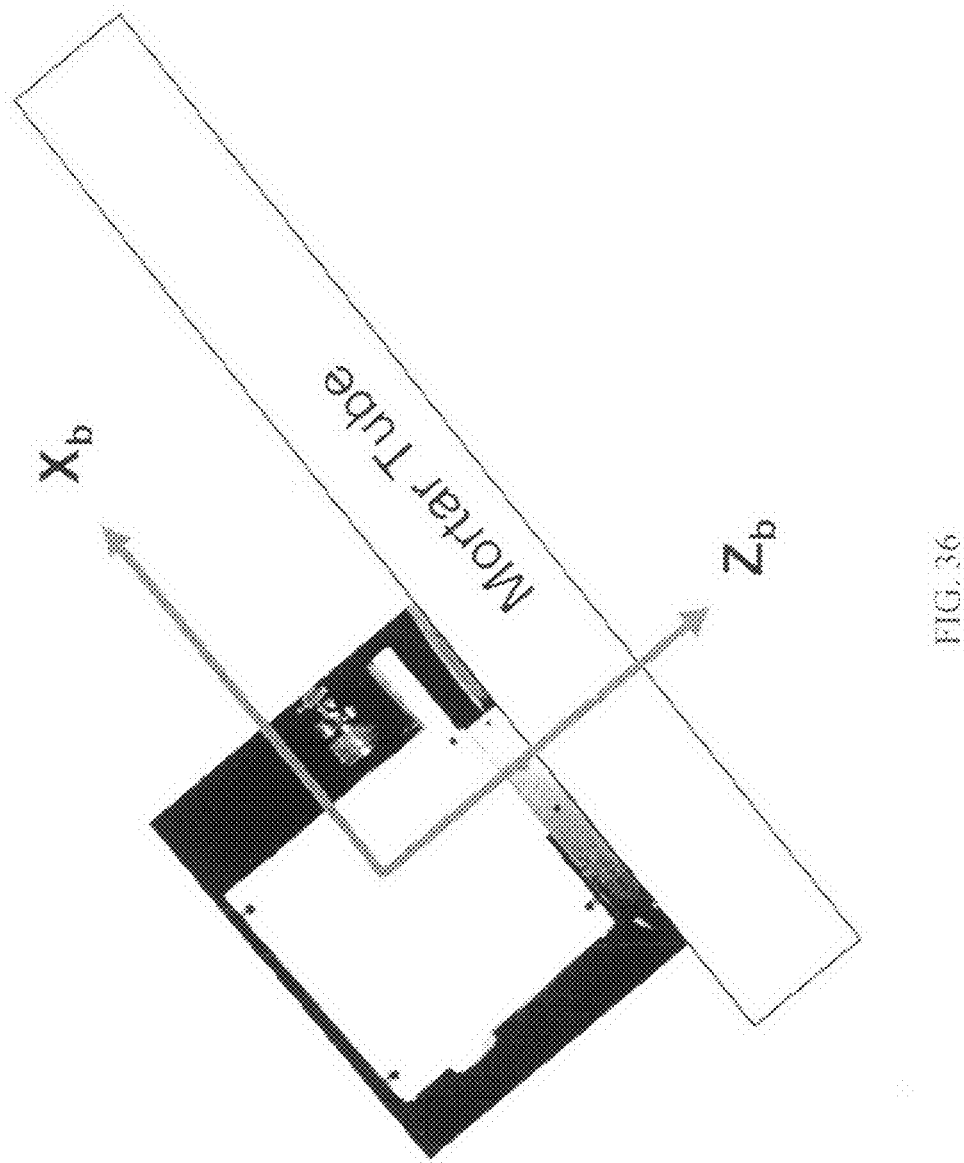
FIG. 36 is a perspective view of the EPD sensor assembly and indexing device mounting configuration 1.
Figure 37:
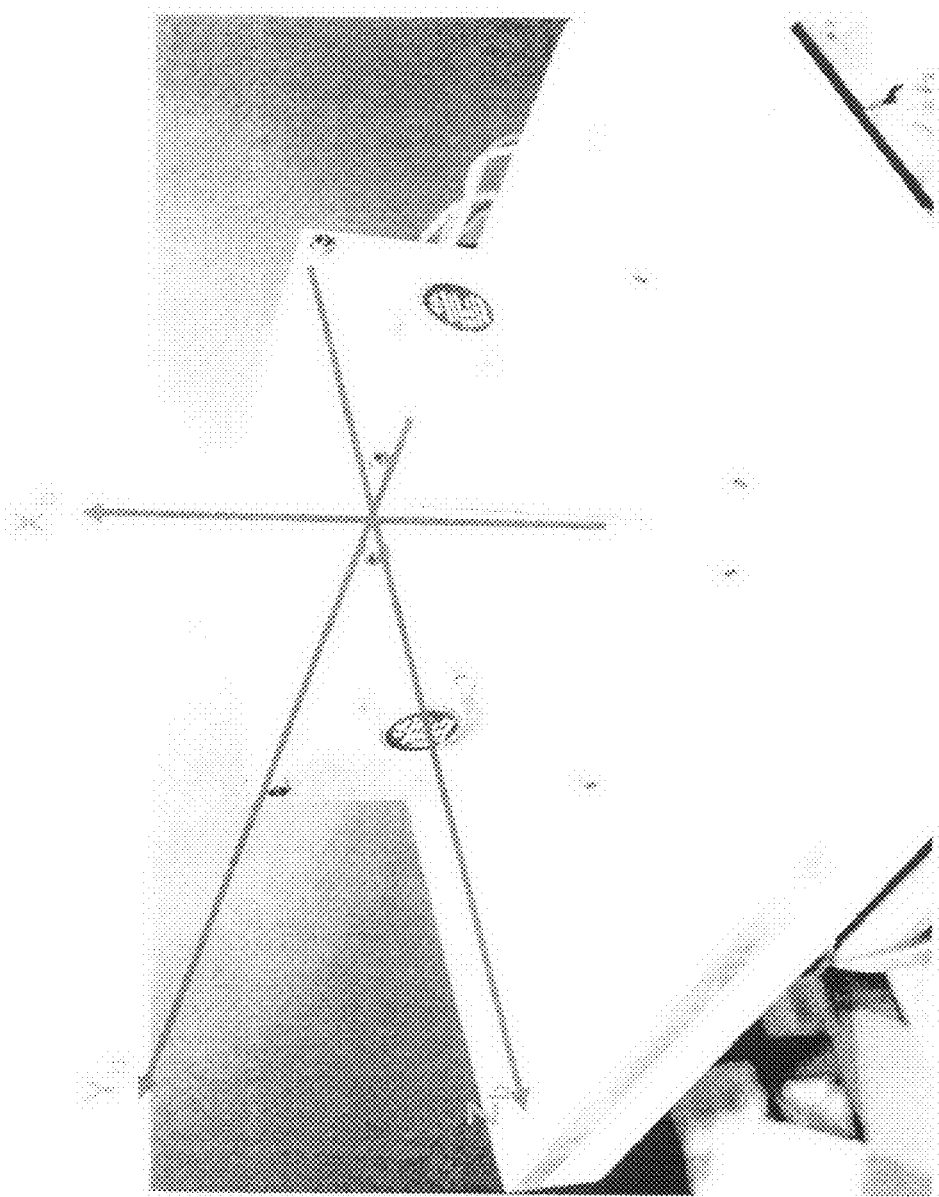
FIG. 37 is a perspective view of the EPD body frame definition for mounting configuration 2.
Figure 38:
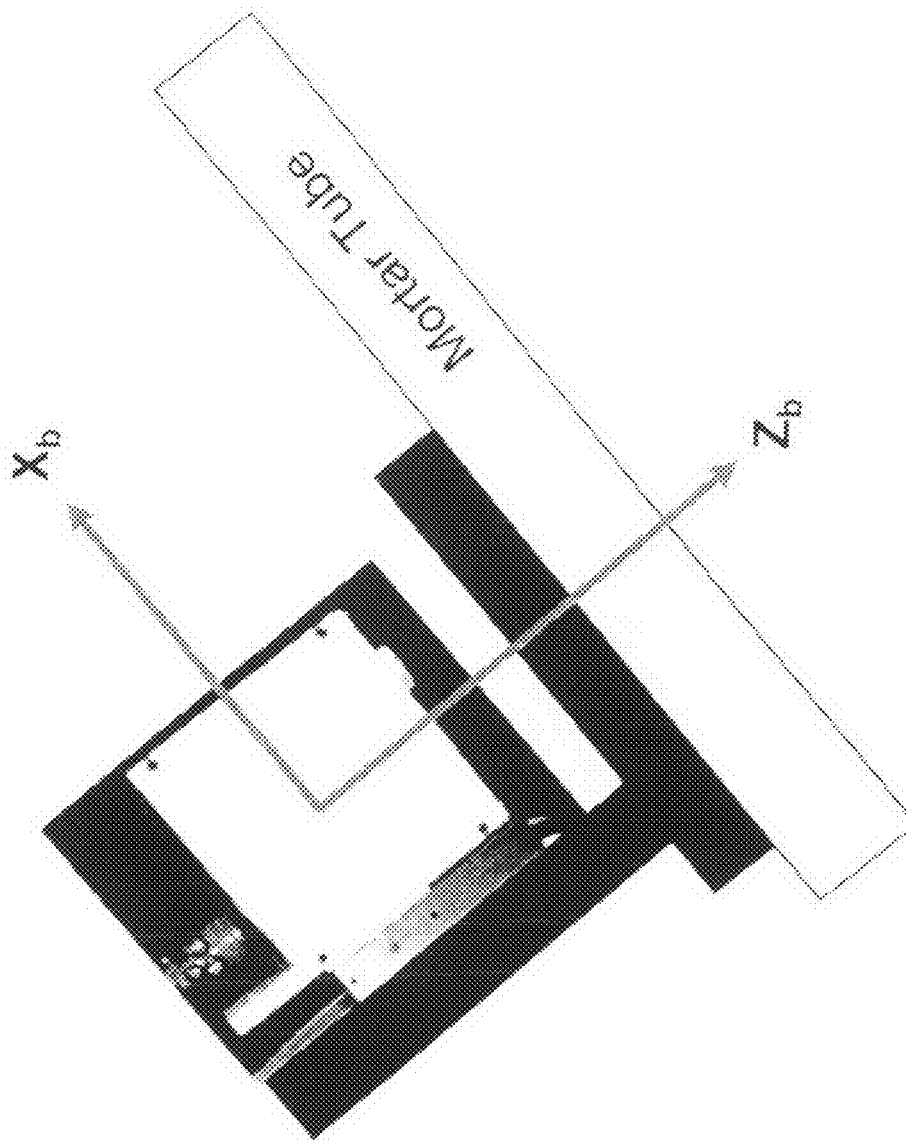
FIG. 38 is a perspective view of the EPD sensor assembly and indexing device mounting configuration 2.

In principle, there can be several different angular positions to mount the EPD sensor assembly and the indexing device 12 on the mortar. In this invention, we will test and evaluate two positions for sensor assembly mounting. FIG. 35 through FIG. 36 depict the EPD body frame definitions and mounting configurations on the mortar. For the two mounting configurations, the EPD body frame definitions are different.

The mounting configuration 1 directly attaches the EPD sensor assembly to the mortar tube. The indexing device 12 rotation axis is aligned with $Z_b$. The attitude determination range for this mounting configuration is:

Pitch—(−90°, 90°) with singular points at ±90°. Fully covers the pitch definition range.

Roll—(−90°, 90°). The full roll definition range is (−180°, 180°).

Heading—[0°, 360°]. Fully covers the Heading definition range.

The mounting configuration 2 attaches the EPD sensor assembly to the mortar tube via a T-shape connector. The indexing device 12 rotation axis is aligned with $X_b$. The attitude determination range for this mounting configuration is:

Pitch—(0°, 90°) with singular points at both 0° and 90°.

Roll—(−180°, 180°). Fully covers the Roll definition range.

Heading—[0°, 360°]. Fully covers the Heading definition range.

In principle, the definition range of the EPD is:
Pitch—(−90°, 90°) with singular points at ±90°.
Roll—(−180°, 180°).
Heading—[0°, 360°].

In practice, for mortar application, the ranges of the attitude are:
Elevation/Pitch—much greater than 0, less than 90°.
Roll—very small, or not of concern.
Azimuth/Heading—[0°, 360°].

4. Summary

In present invention formulates the algorithms related to the indexing device 12 based sensor calibration, which is one of the special features of the EPD system. A summary of the calibration algorithms is presented in the following sections.

In order to reduce the system error induced by the drift of the gyro bias, which is a major error source of the EPD system, we use an indexing device 12 to enhance the observability of the gyro bias errors. As depicted in FIG. 36, the indexing device 12 is installed between the mounting base and the EPD sensor assembly and its motor is automatically controlled by the EPD master processor (or a separate PC in the testing system). According to the calibration requirements, the EPD sensor assembly is driven to rotate around its Z axis. In the EPD System, because of the limitation of the EPD sensor assembly cable, the angular motion $\Delta\theta$ range is limited to −90 degrees to +90 degrees.

During the sensor calibration process, the EPD sensor assembly is driven to stop at different angular positions and the EPD calibration program collects the sensor data at each point (position) and performs calibration processing iteration for each point or performs a batch process after the EPD calibration program collects data at all the stop points.

Usually the sensor calibration process is performed after the system is started. This will reduce or eliminate the gyro bias non-repeatability errors. If the gyro in-run bias drift is large and needs to be recalibrated, a runtime sensor calibration process can be performed periodically at a certain time interval, such as 20 minutes or 1 hour, depending on the value of the uncompensated gyro bias drift. If we require that the normal operation of the EPD can not be interrupted by the sensor calibration process based on the indexing device 12, then the EPD system processing must consider to rebalance (or compensate) the effect of the indexing device 12 caused motion.

We have devised and analyzed two types of the indexing device 12 based sensor calibration processes, one is two-position method, and the other is a multi-position method. For the two-position method, the indexing device 12 only needs to stop at two points, at the original point and another stop point. The two-position method is very fast for it only needs to move the indexing device 12 to another stop point. The disadvantage of this method is that it needs to know the exact motion angle of the indexing device 12, the angle value $\Delta\theta$. This value is controlled by the indexing device 12 motor and its control circuits and the error in the angle value $\Delta\theta$ will cause sensor calibration error.

For the multi-position method, the indexing device 12 must stop at three or more points during the calibration procedure. The advantage of this method is that it does not need to know the motion angles of the indexing device 12, $\Delta\theta_1$, $\Delta\theta_2$, etc., as long as they are not zero and are large enough. And, if more than three points are used, the calibration process can use the redundant information and an optimal estimation method to enhance the calibration accuracy.

For either of the two types of the indexing device 12 based sensor calibration processes the accuracy is related to the values of $\Delta\theta$, $\Delta\theta_1$, $\Delta\theta_2$, etc., the larger the delta value the higher the calibration accuracy. Thus, for the second method the stop points are approximately evenly distributed in the range of (−90, 90) degrees.

In a practical EPD system, the indexing device 12 based sensor calibration processes comprise the following steps:
1. Power on the EPD system and position it on a stationary base.
2. Reset the EPD indexing devise controller and let $\Delta\theta_0=0$.
3. Wait 2 to 3 minutes for the DTG to fully start.
4. Perform ADC to get two channel gyro measurement data.
5. Process the gyro measurement data by two low-pass filters.
6. Average the gyro data over 10 seconds time period.
7. Use the standard deviation of the gyro data over 10 seconds to verify if the EPD system is really on a stationary base.
8. Save the obtained data as packet 1.
9. Move the EPD indexing devise and point the EPD X axis unit to the second angular position and on the stationary base and let $\Delta\theta_1=20$ to 30 degrees.
10. Process the gyro measurement data by two low-pass filters.
11. Average the DTG data over 10 seconds time period.
12. Use the standard deviation of the gyro data over 10 seconds to verify if the EPD system is really on a stationary base.
13. Save the obtained data as packet 2.
14. Repeat step 8 to step 12 until data packet 3 is obtained.
15. Use the obtained data as packets 1, 2, and 3 to calculate the 2 DTG biases. The obtained DTG biases are then used for EPD system processing.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A self-calibration electric pointing device, comprising:
a sensors/actuator assembly wherein further comprises:
a 2-axis DTG (Dynamically Tuned Gyro) for sensing the earth rate and said device angular motion;
a first accelerometer;
a second accelerometer with said first accelerometer for sensing gravity; and
an indexing device carrying said 2-axis DTG, said first accelerometer, and said second accelerometer for real-time multiple position sensor calibration, wherein said indexing device moves said 2-axis DTG, said first accelerometer, and said second accelerometer when said system is starting or during said system operation for sensor calibration, wherein said sensor calibration is a two-position calibration that said indexing device only needs to stop at two points from an original point to a stop point to complete said sensor calibration;
a sensor interface circuits; and
a computation platform electrically connected with said sensors/actuator assembly by said sensor interface circuits for processing measurement from said sensors/actuator assembly for pointing.

2. The device, as recited in claim 1, wherein an exact motion angle of said indexing device is known for said two-position calibration.

3. The device as recited in claim 2, wherein said sensors/actuator assembly further comprises a device communicatively connected with said indexing device for testing and motion detection aiding.

4. The device, as recited in claim 3, wherein said sensor interface circuits further comprises: 2 channels high accuracy ADC module for said two accelerometer measurement outputs; and 2 channels high accuracy ADC module, for two DTG angular measurement outputs, wherein said ADC modules have standard interfaces to the computation platform.

5. A self-calibration electric pointing device, comprising:
a sensors/actuator assembly wherein further comprises:
a 2-axis DTG (Dynamically Tuned Gyro) for sensing the earth rate and said device angular motion;
a first accelerometer;
a second accelerometer with said first accelerometer for sensing gravity; and
an indexing device carrying said 2-axis DTG, said first accelerometer, and said second accelerometer for real-time multiple position sensor calibration, wherein said indexing device moves said 2-axis DTG, said first accelerometer, and said second accelerometer when said system is starting or during said system operation for sensor calibration, wherein said sensor calibration is a multi-position calibration that said indexing device needs to stop at three or more stopped points to complete said sensor calibration;
a sensor interface circuits; and
a computation platform electrically connected with said sensors/actuator assembly by said sensor interface circuits for processing measurement from said sensors/actuator assembly for pointing.

6. The device as recited in claim 5, wherein said sensors/actuator assembly further comprises a device communicatively connected with said indexing device for testing and motion detection aiding.

7. The device, as recited in claim 6, wherein said sensor interface circuits further comprises: 2 channels high accuracy ADC module for said two accelerometer measurement outputs; and 2 channels high accuracy ADC module, for two DTG angular measurement outputs, wherein said ADC modules have standard interfaces to the computation platform.

8. The device, as recited in claim 7, wherein motion angles of said indexing device are unknown and are not zero.

9. The device, as recited in claim 8, wherein said stop points are approximately evenly distributed in a range of (−90, 90) degrees.

* * * * *